(12) United States Patent
Fujimoto

(10) Patent No.: US 7,150,496 B2
(45) Date of Patent: Dec. 19, 2006

(54) PANEL STRUCTURE FOR CAR BODY HOOD

(75) Inventor: Toshio Fujimoto, Kobe (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 10/450,248

(22) PCT Filed: Dec. 13, 2001

(86) PCT No.: PCT/JP01/10948

§ 371 (c)(1),
(2), (4) Date: Jun. 12, 2003

(87) PCT Pub. No.: WO02/47961

PCT Pub. Date: Jun. 20, 2002

(65) Prior Publication Data

US 2004/0021342 A1   Feb. 5, 2004

(30) Foreign Application Priority Data

Dec. 13, 2000  (JP)  ............ 2000-378841
Mar. 23, 2001  (JP)  ............ 2001-085143
Nov. 7, 2001   (JP)  ............ 2001-342131

(51) Int. Cl.
B32B 1/00 (2006.01)

(52) U.S. Cl. ............ 296/187.04; 296/193.11; 180/69.22; 180/69.23

(58) Field of Classification Search ........ 296/193.11, 296/187.04, 76, 187.09; 180/69.22, 69, 69.23
See application file for complete search history.

(56) References Cited

U.S. PATENT DOCUMENTS

| | | | |
|---|---|---|---|
| 2,178,998 A * | 11/1939 | Scott ............ 123/41.7 |
| 2,250,795 A * | 7/1941 | Fitzgerald et al. ......... 180/68.4 |
| 2,683,498 A * | 7/1954 | Schaack ............ 180/69.2 |
| 3,358,787 A * | 12/1967 | Bangasser et al. ......... 180/69.2 |
| 3,831,997 A * | 8/1974 | Myers ............ 296/187.09 |
| 5,000,997 A * | 3/1991 | Ritchie et al. ............ 428/78 |
| 5,115,878 A * | 5/1992 | Hayata ............ 180/69.21 |
| 5,124,191 A * | 6/1992 | Seksaria ............ 428/178 |
| 5,131,710 A * | 7/1992 | Kamiguchi et al. ........... 296/76 |
| 5,149,169 A * | 9/1992 | Nozaki ............ 296/206 |
| 5,884,962 A | 3/1999 | Mattingly et al. |
| 6,048,022 A * | 4/2000 | Ishibashi et al. ....... 296/187.09 |
| 6,056,075 A * | 5/2000 | Kargilis ............ 180/68.1 |
| 2004/0113459 A1* | 6/2004 | Mattsson et al. ...... 296/187.04 |

FOREIGN PATENT DOCUMENTS

| DE | 195 27 181 | 2/1996 |
|---|---|---|
| EP | 0 992 418 | 4/2000 |
| JP | 64-5876 | 1/1989 |
| JP | 5876/1989 | 1/1989 |
| JP | 5-139338 | 6/1993 |

(Continued)

*Primary Examiner*—Stephen Gordon
(74) *Attorney, Agent, or Firm*—Oblon, Spivak, McClelland, Maier & Neustadt, P.C.

(57) ABSTRACT

A hood structure comprises an outer and an inner which form a closed cross section through spaces. The inner's cross-sectional shape is a sine curve, an nth-power-raised sine curve, or a spline curve having a corrugation length approximate to an outside head diameter. This corrugated hood structure can provide a uniform, excellent head impact resistance independently of impact positions on the hood. The corrugated hood structure also excels in tension rigidity, bending rigidity, and torsional rigidity. Accordingly, the car body hood panel structure satisfies requirements of head impact resistances for pedestrian protection and rigidity improvement such as the tension rigidity.

10 Claims, 30 Drawing Sheets

FOREIGN PATENT DOCUMENTS

| | | |
|---|---|---|
| JP | 5-155355 | 6/1993 |
| JP | 5-155356 | 6/1993 |
| JP | 7-165120 | 6/1995 |
| JP | 7-285466 | 10/1995 |
| JP | 8-318875 | 12/1996 |
| JP | 9-249157 | 9/1997 |
| JP | 10-129526 | 5/1998 |
| JP | 10-129528 | 5/1998 |
| JP | 10-175490 | 6/1998 |
| JP | 11-91627 | 4/1999 |
| JP | 11-208511 | 8/1999 |
| JP | 2000-168622 | 6/2000 |
| WO | WO 00/35612 | 6/2000 |

* cited by examiner

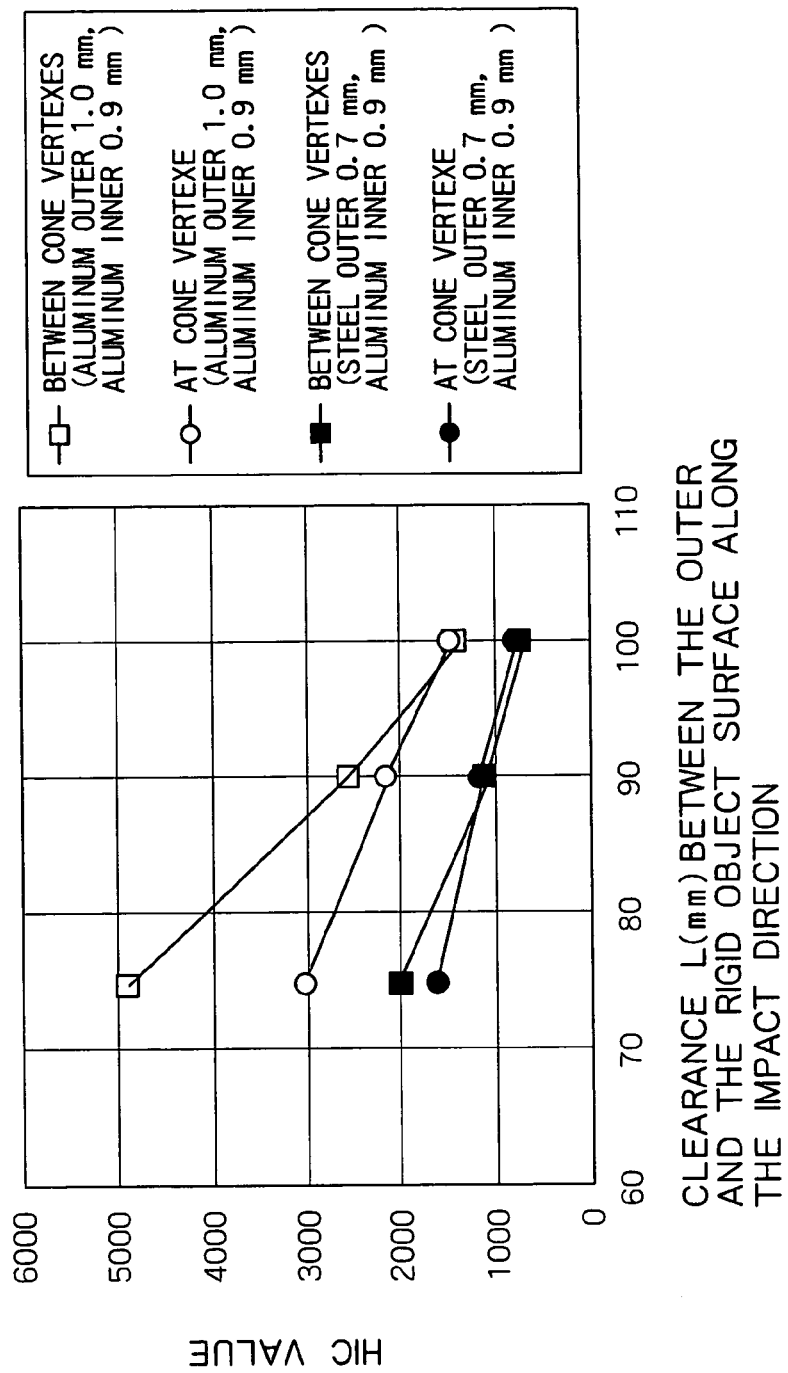

PANEL STRUCTURE FOR CAR BODY HOOD

TECHNICAL FIELD

The present invention relates to a car body hood panel structure that excels in the head impact resistance for protecting a pedestrian and is made of a metal material such as aluminum alloy, steel excellent in the bending rigidity, the torsional rigidity, and the like.

BACKGROUND ART

Conventionally, the panel structure of car body members such as for automobiles uses a closed sectional structure through spaces in combination with an outer panel (hereafter simply referred to as an outer) and an inner panel (hereafter simply referred to as an inner).

The panel structures for a car hood, a roof, doors, and the like especially use mechanical, soldering, and adhesive means such as resins to combine the outer and the inner that is provided at one side of the outer toward the bottom of the car body to reinforce the outer.

The inner or both the inner and the outer for these car body panel structures are becoming using highly rigid and moldable aluminum alloy plates such as AA or JIS standard compliant 3000, 5000, 6000, and 7000 series for weight saving in addition to or instead of the conventionally used steel. Hereafter, aluminum is simply represented as Al.

Recently, car panel structures including the Al alloy plates need to be highly rigid as well as thin and light-weight. The member characteristics need to excel in the bending rigidity, the torsional rigidity, and tension rigidity (dent resistance).

Conventionally, car body hood inners are available in the beam type and the cone type. The beam-type inner provides each panel with a trim section for weight saving. The cone-type inner has no trim section on the basis of the closed sectional structure. Relatively large convex sections (protrusions) called cones are arranged on the cone-type inner at a regular interval. Each cone has a trapezoidal sectional view. With respect to the tension rigidity and the bending rigidity, a hood structure using this inner (cone-type hood structure) is equivalent to a structure using the beam-type inner (beam-type hood structure) in accordance with the rigidity design of the hood. On the other hand, with respect to the torsional rigidity, the cone-type hood structure is approximately twice as rigid as the beam-type hood structure. Recently, special attention is paid to the cone-type hood structure.

Recently, from the viewpoint of protecting pedestrians, hood design requirements tend to consider the safety against impact to a pedestrian's head. Concerning the beam-type hood structure, there are several disclosures (JP-A Nos. 165120/1995, 285466/95, and 139338/93). In addition, the EEVC (European Enhanced VeHICle-Safety Committee) specifies an HIC value of 1000 or less as a hood condition with respect to the impact resistance to adult and child heads (described in EEVC Working Group 17 Report, Improved test Methods to evaluate pedestrian protection afforded by passenger cars, December 1998).

However, the prior art is accompanied by the following problems.

(1) [Problem 1] Increasing the Tension Rigidity

There may occur cases where the conventional cone-type and beam-type inners cannot satisfy the demand for increased rigidity when they are thinned and made to be lightweight.

FIG. 13(a) is a longitudinal sectional view of an inner. FIG. 13(b) is a plan view of the inner. As shown in these figures, there are arranged many conic convex sections (protrusions) 14 at a regular interval on the surface of a cone-type inner 13. There is formed a flat section or a concave section 16 between the convex sections 14. The reference numeral 21 represents a horseshoe bead provided at an outside periphery of the panel. The bead 21 is universally used for reinforcing the rigidity of the inner As shown in FIG. 13(a), the cone-type inner 13 is joined to an Al alloy outer 12 having a specified curvature to constitute the closed sectional structure through spaces and to be integrated into a panel structure 11. In the example of FIG. 13(a), there is provided a resin layer 15 on a flat top 14a of the convex 14 on the inner 13. The resin layer 15 is used to join the convex 14 of the inner 13 to a rear surface 12a of the outer 12. The panel periphery is hemmed (bent) to be integrated into the panel structure.

FIG. 14 is a perspective view showing an example of applying the beam-type inner to a car body hood. As shown in FIG. 14, the beam-type inner 17 comprises beams 19 appropriately crossing longitudinally, transversely, and slantwise with reference to a plane direction of the panel. The beam-type inner has a trim structure having a trimmed space section 20 between the beams 19. The beam-type inner 17 is also joined to the rear surface of an outer 18 to constitute the closed sectional structure through spaces and to be integrated into a panel structure.

The panel structure is locally reinforced by reinforcing members such as a hinge reinforcement 21 and a latch reinforcement 22 including the cone-type inner.

These cone-type hood structures are approximately twice as rigid as conventionally used general-purpose beam-type hood structures and can be assumed to be excellent in the rigid design. This is because the closed sectional structure of the cone-type hood structure excels in the rigidity against a torsional load. In addition, the cone-type hood structure has the bending rigidity equivalent to that of the beam-type hood structure. The cone-type hood structure does not necessarily provide the sufficient tension rigidity. The cone-type hood structure is requested to increase the tension rigidity.

As a result, a relatively large, thick plate must be used for the panel at the sacrifice of weight saving in order to increase the tension rigidity for the conventional cone-type inner.

Therefore, it is an object of the present invention is to provide a car body hood panel structure capable of satisfying a demand for increased rigidities such as the tension rigidity in order to take advantage of weight saving by thinning the panel on the assumption of high torsional rigidity characteristic of the conventional closed sectional structure.

(2) [Problem 2] Improving the Head Impact Resistance for Protecting Pedestrians

Generally, the head impact resistance evaluated in accordance with the following HIC (Head Injury Criteria) value with respect to Automobile Technical Handbook, Vol. 3, Test and Evaluation, 2d ed. (Society of Automotive Engineers of Japan, Inc., Jun. 15, 1992).

$$HIC = \left[ 1/(t2-t1) \int_{t1}^{t2} a\,dt \right]^{2.5} (t2-t1)$$

where a is 3-axis composed acceleration (in units of G) at the head centroid, and t1 and t2 are times having the relationship of 0<t1<t2 to cause a maximum HIC value. An operation time (t2−t1) is specified to be 15 msec or less.

EEVC Working Group 17 Report specifies an HIC value of 1000 or smaller for each of impact resistances to adult and child heads as a condition attributed to the hood. In this report, the head impact test uses a head impact speed of 40 km/hr. The test specifies a weight of 4.8 kg, an external diameter of 165 mm, and an impact angle of 65 degrees for the adult head; and a weight of 2.5 kg, an external diameter of 130 mm, and an impact angle of 50 degrees for the child head.

During the head impact test, the pedestrian's head first impacts on the outer. Then, the deformation progresses to transmit a reactive force to rigid parts such as an engine in the engine room via the inner, causing an excess impact on the head. The head is subject to a first acceleration wave and a second acceleration wave. The first acceleration wave is mainly generated by impact against the outer approximately within 5 msec from the beginning of the impact. When the inner impacts on a rigid object, the second acceleration wave is generated approximately 5 msec or later from the beginning of the impact. The elastic rigidity of the outer mainly determines the magnitude of the first acceleration wave. The elastoplastic rigidity of the inner mainly determines the magnitude of the second acceleration wave. Deformation energies for the outer and the inner absorb the kinetic energy at the head. If the head's movement distance exceeds a clearance between the outer and a rigid object such as the engine, the head is directly subject to a reactive force from the rigid object. Consequently, the head is subject to a fatal damage equivalent to an excess impact greatly exceeding the maximum HIC value of 1000.

(3) [Problem 2-1] Capable of Decreasing the HIC Value Despite a Small Head Movement Distance According as a clearance is increased between the outer and a rigid object such as the engine, the head's movement distance can be increased. This is advantageous to reducing the HIC value. However, the hood design inevitably is accompanied by limitations. There is a need for a hood structure capable of reducing the HIC value despite a small clearance and a short head movement distance.

More severe impact conditions are required especially for the adult's head impact than for the child's head impact. An excess clearance needs to be provided between the outer and the rigid object surface beyond the design allowance (described in EEVC Working Group 17 Report).

As another problem, it is difficult to satisfy the HIC value of 1000 for both children and adults with different impact characteristics along the line WAD1500 that provides a possibility of head impacts both for children and adults. The line WAD1500 indicates a 1500 mm distance along the border line from the ground surface at the car body front to the hood impact position. More particularly, the line WAD1500 for a large sedan' hood is located immediately above the engine so that just a small clearance is left between the outer and the rigid object surface, causing a demand for effective countermeasures. (described in EEVC Working Group 17 Report)

(4) [Problem2-2] Uniform HIC Value Independent of Impact Portions

With respect to head impact positions, a large HIC value results immediately above the frame for the beam-type hood structure or at the cone vertex for the cone-type hood structure. This is because these portions provide high local rigidity, cause small deformation if impacted on a rigid object, and are subject to a high reactive force from the rigid object. From the viewpoint of safety, there has been a demand for a hood structure that can provide an approximately uniform HIC value independently of impact portions.

(5) [Problem 2-3] Applicability of Aluminum Material

The third problem to be solved is to provide an excellent head impact resistance despite the use of an aluminum material capable of weight saving as a hood material. The aluminum material is often used for light-weighting the hood. Compared to the use of the steel material, however, the use of the aluminum material is generally considered to be disadvantageous from the viewpoint of protecting pedestrians. This is mainly because the elastic modulus and the gravity of the aluminum material are approximately one third of those of the steel material. If the hood is used to absorb the kinetic energy of the head, the membrane rigidity and the weight of the aluminum hood as the panel structure are insufficient compared to those of the steel hood.

The bending rigidity of a plate material is proportional to $ET^3$, where E is a Young's modulus and T is a plate thickness. The membrane rigidity thereof is proportional to ET. When the steel material (Young's modulus Es, plate thickness Ts, and gravity γs) is replaced by the aluminum material (Young's modulus Ea, plate thickness Ta, and gravity γa), the plate thickness is determined as follows so that the same bending rigidity results.

$$EaTa^3 = EsTs^3$$

$$Ea/Es = 1/3$$

Hence, $$Ta/Ts = 3^{1/3} = 1.44$$

A membrane rigidity ratio of the aluminum hood to the steel hood becomes:

$$(EaTa)/EsTs = 1.44/3 = 0.48$$

A weight ratio thereof becomes:

$$(Ta\gamma a)/(Ts\gamma s) = 1.44/3 = 0.48$$

The membrane rigidity and the weight of the aluminum hood are just 0.48 times as large as those of the steel hood. As a result, when the head impacts on the hood, the head movement distance increases and the head easily impacts on a rigid object. The outer absorbs a small energy at the first acceleration wave, increasing the second acceleration wave. Accordingly, the conventional hood structure increases the HIC value, making it very difficult to satisfy limits of the HIC value.

Of course, making Ta equal to a triple of Ts provides the same membrane rigidity ratio and weight ratio as those for the steel hood. However, this causes excess costs, unpractical for the design.

In this manner, it is very difficult to use the aluminum material for the hood and limiting conditions for the head impact under this condition. Of course, if there is found an aluminum hood structure that satisfies this condition, a steel hood employing this structure can further decrease the HIC value.

As mentioned above, the following summarizes problems to be solved for the hood structure from the viewpoint of pedestrian protection as another object of the present invention.

(a) Capable of decreasing the HIC value despite a small head movement distance;

(b) Providing the approximately uniform HIC value independently of impact portions on the hood; and (c) Capable of sufficiently decreasing the HIC value even using an aluminum hood.

DISCLOSURE OF THE INVENTION

In order to achieve these objects, the car body hood panel structure according to the present invention is expressed as a closed sectional structure comprising a combination of an outer panel and an inner panel through spaces, wherein a plurality of corrugated beads is provided parallel to each other on an entire surface of the inner panel and a cross-sectional shape of the inner panel is corrugated.

There is provided the inner having a corrugated cross section (hereafter referred to as the corrugated inner) as mentioned above. If the car body hood panel structure using the corrugated inner (hereafter referred to as the corrugated hood structure) comprises the outer and the inner which are thinned, it is possible to drastically improve the tension rigidity of the hood structure. In addition, the bending rigidity and the torsional rigidity can be also ensured sufficiently. As a result, the hood can be suppressed from being deformed against external loads.

Further, with respect to pedestrian protection, it is possible to improve the resistance to impact between the head and the hood for higher safety. Consequently, the following features can be provided.

(a) Capable of decreasing the HIC value despite a small head movement distance;

(b) Providing the approximately uniform HIC value independently of impact portions on the hood; and (c) Capable of sufficiently decreasing the HIC value even using an aluminum hood.

In addition, the panel structure according to the present invention features a simple configuration using the above-mentioned corrugated inner. It is possible to increase the tension rigidity and the bending rigidity, and enable weight saving without increasing the inner plate thickness as conventionally practiced. A flat panel can be easily press-molded into the above-mentioned corrugated inner, making manufacture of the inner itself easy.

Moreover, as mentioned above, the panel structure according to the present invention is capable of improving the rigidity as the panel structure itself. It is possible to use a light aluminum alloy as a material for the outer and the inner.

From the viewpoint of hood weight saving, the hood tension rigidity can be improved drastically by means of the corrugated inner and the corrugated hood structure using the same according to the present invention. It is possible to provide the hood structure fully featuring the torsional rigidity and the bending rigidity. From the viewpoint of pedestrian protection, it is possible to provide the hood structure excellent in the head impact resistance. In this case, the hood structure, if made of aluminum, can sufficiently decrease HIC values even through a small clearance between the outer and a rigid object and can provide approximately uniform HIC values independently of impact positions on the hood. Furthermore, it is possible to provide the cone-type hood structure using the steel outer excellent in the head impact resistance for pedestrian protection.

In order to achieve these effects, the above-mentioned corrugated shape preferably traces a sine curve or an nth-power-raised sine curve. The nth-power-raised sine curve refers to a group of curves using $\sin^n(\theta)$, where $\theta$ indicates a parameter representing a position and n indicates an integer greater than or equal to 1. The static rigidity of the hood can be improved through the use of the corrugated inner whose corrugated shape follows the sine curve or the nth-power-raised sine curve. Furthermore, it is possible to decrease the head acceleration for a head impact from the viewpoint of pedestrian protection.

In addition, it is preferable that the plurality of corrugated beads is provided in any arrangement selected from those which are parallel or slantwise against a longer direction of the panel structure, concentric approximately around the center of the panel structure, and doubly corrugated as a combination of these arrangements. Since the corrugated inner uses the plurality of corrugated beads provided in any arrangement selected from those which are parallel or slantwise against a longer direction of the panel structure, concentric approximately around the center of the panel structure, and doubly corrugated as a combination of these arrangements, the static rigidity of the hood can be improved. Furthermore, it is possible to decrease the head acceleration for a head impact from the viewpoint of pedestrian protection.

It is possible to formulate a preferable range of corrugation length p of the corrugated inner based on a sine wave with reference to outside head diameter d as follows in case of a head impact for pedestrian protection from the viewpoint of impact resistance improvement.

$$0.7 < p/d < 1.7$$

This range is effective for decreasing HIC values.

It is possible to formulate a preferable range of corrugation height h of the corrugated inner based on a sine wave with reference to outside head diameter d as follows in case of a head impact for pedestrian protection from the viewpoint of impact resistance improvement.

$$0.15 < h/d < 0.4$$

This range is effective for decreasing HIC values.

That is to say, HIC values greatly decrease through the use of the corrugated inner whose corrugation height and corrugation length satisfy the preferable ranges. It is possible to provide the hood structure excellent in the head impact resistance.

When the inner panel is locally provided with a reinforced plate, the head impact resistance can be increased at the reinforced position. It is possible to provide the hood structure capable of locally improving the head impact resistance at a position where there is a small clearance between the outer and the rigid object surface.

When there is provided the method of softly joining the outer and the inner, tops of the corrugated inner is provided with local bonding sections in a cross-stitched or distributed manner. Since very soft joining sections are provided, there is no sacrifice of a backlash vibration between the outer and the inner during a head impact from the viewpoint of the pedestrian protection. As a result, the head acceleration waveform is disturbed to enable the HIC value to be decreased.

The invention uses the inner (hereafter referred to as the spline-type inner) whose corrugated shape is defined by a spline function. Consequently, the corrugated inner can be designed in consideration for arrangement of complicated rigid parts in an engine room. It is possible to decrease HIC values and improve the head impact resistance.

The invention can efficiently absorb a head impact energy by means of the steel outer having large membrane rigidity and weight, control the head's first acceleration wave to an appropriate size, and efficiently absorb the remaining impact energy by means of the aluminum alloy corrugated inner or the like excellent in the bending rigidity. As a result, it is possible to provide the light-weight and economical hood structure excellent in the head impact resistance.

The invention can provide the light-weight and economical hood structure excellent in the head impact resistance.

BRIEF DESCRIPTION OF DRAWINGS

FIG. 11 illustrates load conditions onto the hood structure, wherein

FIG. 13 shows a conventional cone-type hood structure, wherein

FIG. 33 shows an analysis result of the adult head impact;

BEST MODE FOR CARRYING OUT THE INVENTION

Several preferred examples of the corrugated hood structure according to the present invention will be described below with reference to the accompanying drawings.

Figure 1:
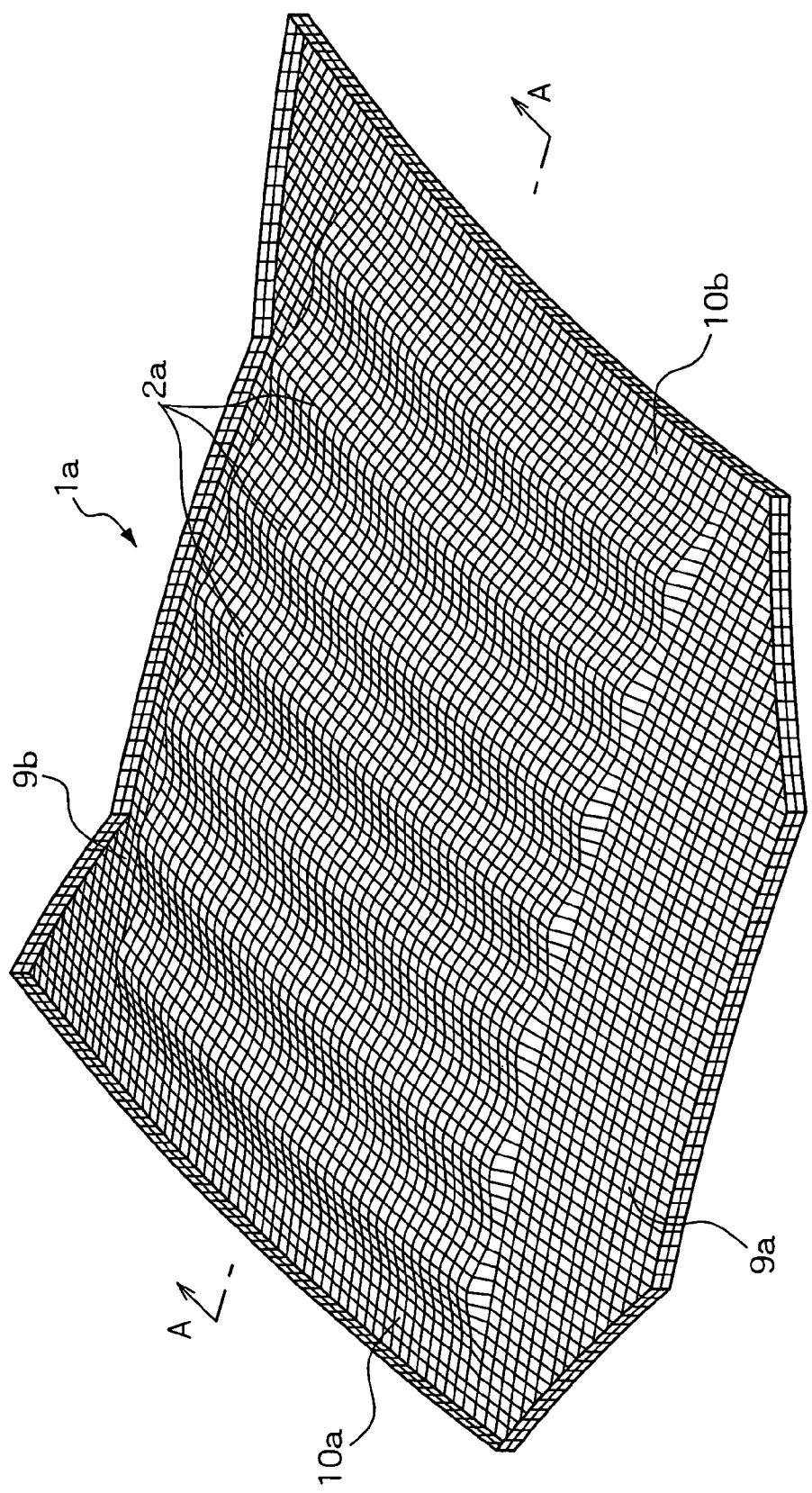
FIG. 1 is a perspective view showing an example of an inner according to the present invention.
Figure 2:
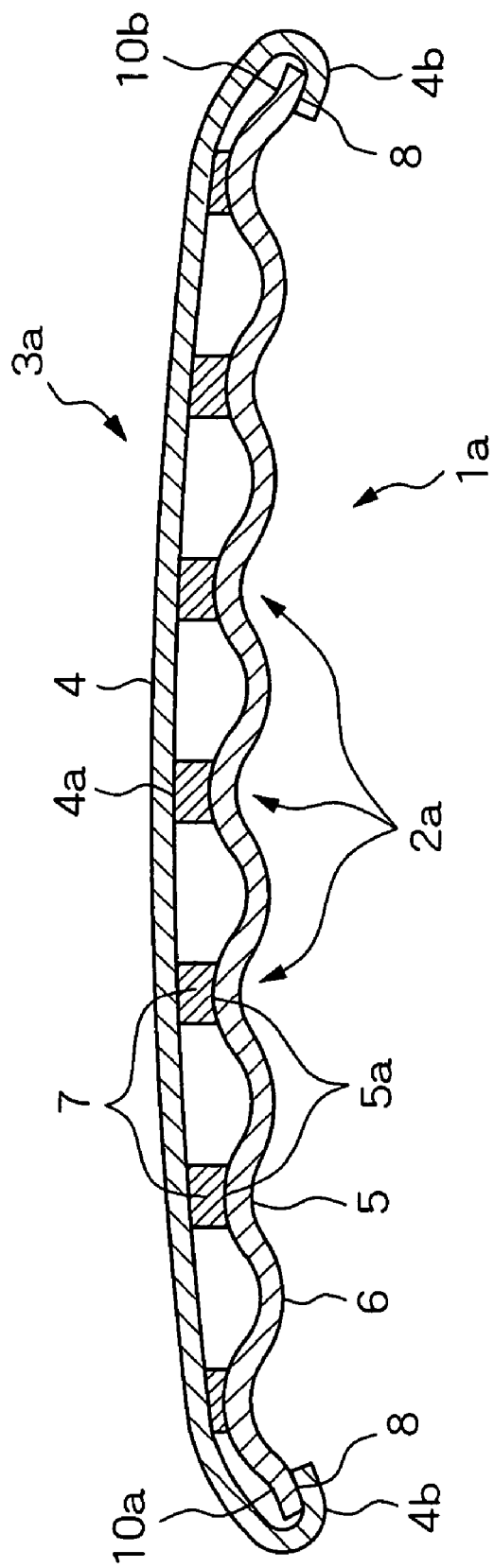
FIG. 2 is a sectional view taken along lines A—A of a corrugated hood structure using the inner in FIG. 1.

First, an example of the corrugated hood structure according to the present invention will be described. FIG. 1 is a perspective view of the inner. FIG. 2 is a sectional view taken along lines A—A of FIG. 1. FIG. 1 is meshed for easy understanding of the corrugated form according to the present invention.

An inner 1a in FIGS. 1 and 2 is made of light-weight and high-tension metal such as an aluminum alloy and a high-tension steel plate. There is provided a plurality of corrugated beads (convex streak) 2a approximately parallel along the car length direction all over the panel except peripheries 9a (toward the car front), 9b (toward the driver seat), 10a and 10b (along the car side). The approximate parallel relationship is applied to not only straight corrugated beads, but also curved corrugated beads such as concentric circles and ovals to be described later.

As shown in the sectional view of FIG. 2, a corrugated bead 2a forms a corrugated shape comprising a continuous sine curve along the car width. The corrugated bead 2a comprises a convex streak 5 and a concave streak 6. The convex streak 5 is protruded toward the rear of the outer and has a cross section forming a gentle arc or a rib in the longer direction. On the contrary, the concave streak 6 is depressed and likewise has a cross section forming a gentle arc or a rib in the longer direction. In FIGS. 1 and 2, seven straight corrugated beads 2a are approximately parallel provided independently of each other (with an interval) on the surface of the inner 1a.

The corrugated beads 2a in FIGS. 1 and 2, including the concave streaks 6, have approximately the same width across the longer direction. However, the corrugated beads 2a including the concave streaks 6 need not always have the same width across the longer direction. From a planar viewpoint, for example, it may be preferable to provide a locally narrowing constriction or dent functioning as a starting point for the overall deformation of the inner in case of a car collision to absorb a shock and protect fellow passengers. Alternatively, the corrugated beads 2a may be formed to be gradually narrowing or expanding in accordance with the car body design.

The conditions for the corrugated beads 2a and the concave streaks 6 such as the sectional shape (width, height, tilt angle for the slope), the number of beads, the length, and the like are not limited to this embodiment. In consideration for the optimization of the rigidity and the ease of molding, it is preferable to select the corrugation height h from the range between 10 and 60 mm and the corrugation length p from the range between 90 and 300 mm.

For example, it is possible to increase the rigidity of the inner or the panel structure according as the corrugated beads including the concave streaks form a large cross sectional shape, many corrugated beads are provided, and corrugated beads are provided all over the panel.

Accordingly, the sectional shape and condition of the corrugated beams 2a and the concave streaks 6 are appropriately selected in consideration for the relationship among the tension rigidity, the torsional rigidity, and the bending rigidity requested for the rigidity design, and a criterion whether molding is possible or easy (moldability).

For further light-weighting the inner, it may be preferable to provide the corrugated bead 2a and the concave streak 6 with a space or a cutout (any shape such as a circle, a rectangle, or the like) by partially trimming the panel so as not to affect the rigidity and the strength.

Further, it may be preferable to appropriately combine another rigidity reinforcing means. For example, the inner may be made as a tailor blank to thicken the inner's outside periphery compared to the center plate thickness and to improve the bending rigidity of the panel or the panel structure against a bending load applied to the edge of the panel or the panel structure.

(Cross-Sectional Shapes of the Inner)

Cross-sectional shapes of the inner according to the present invention may be defined by a sine-curve corrugation or an nth-power-raised sine wave. Further, it may be preferable to adjust the local rigidity by providing small concaves and convexes on the sine curve or the nth-power-raised sine curve.

(Arranging the Corrugated Beads on the Inner)

Perspective views in FIGS. 4 through 10 show examples of arranging the corrugated beads on the corrugated inner according to the present invention. Integration of the inner and the outer basically follows the same manner or procedure as that for the panel structure described in FIG. 2. Like FIG. 1, FIGS. 4 through 10 are also meshed.

When the corrugated inner according to the present invention is observed from a planar viewpoint, it is preferable to arrange the corrugated beads parallel to each other so as to be parallel or oblique against the longer direction of the hood, concentric or oval approximately around the center of the corrugated inner, and doubly corrugated as a combination of these arrangements. The corrugated beads arranged in these manners configure a cross-sectional shape of the inner across the overall panel. It should be noted that these specific arrangements are not strictly specified. The specification includes the meaning of approximation such as "approximately parallel" or "approximately concentric" in terms of permitting allowable tolerances as far as an effect of improving the rigidity is not impaired.

Figure 4:
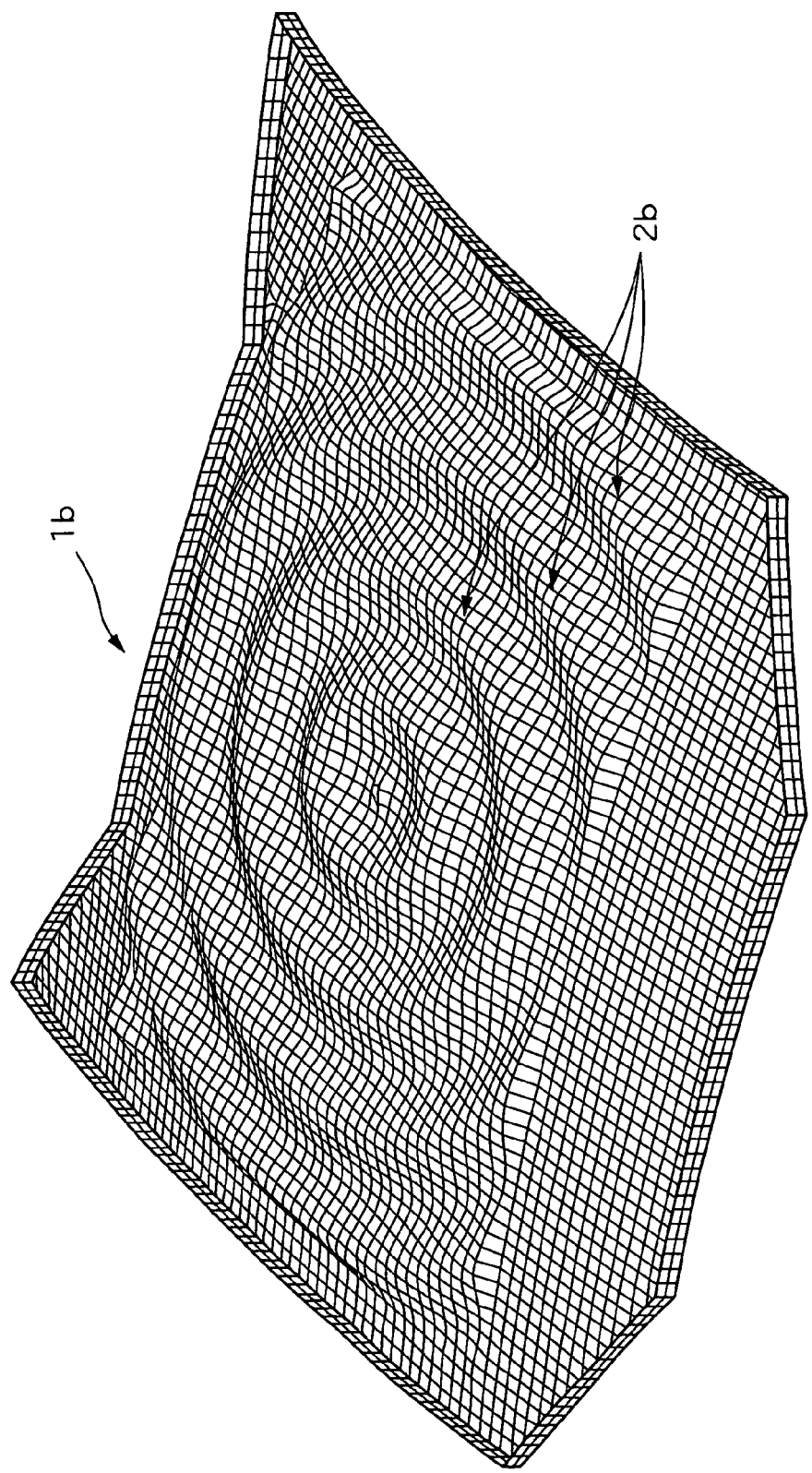
FIG. 4 is a perspective view showing another example of the corrugated inner according to the present invention.

An inner 1b in FIG. 4 is provided with a plurality of corrugated beads 2b approximately parallel to each other and concentrically all over the panel.

Figure 5:
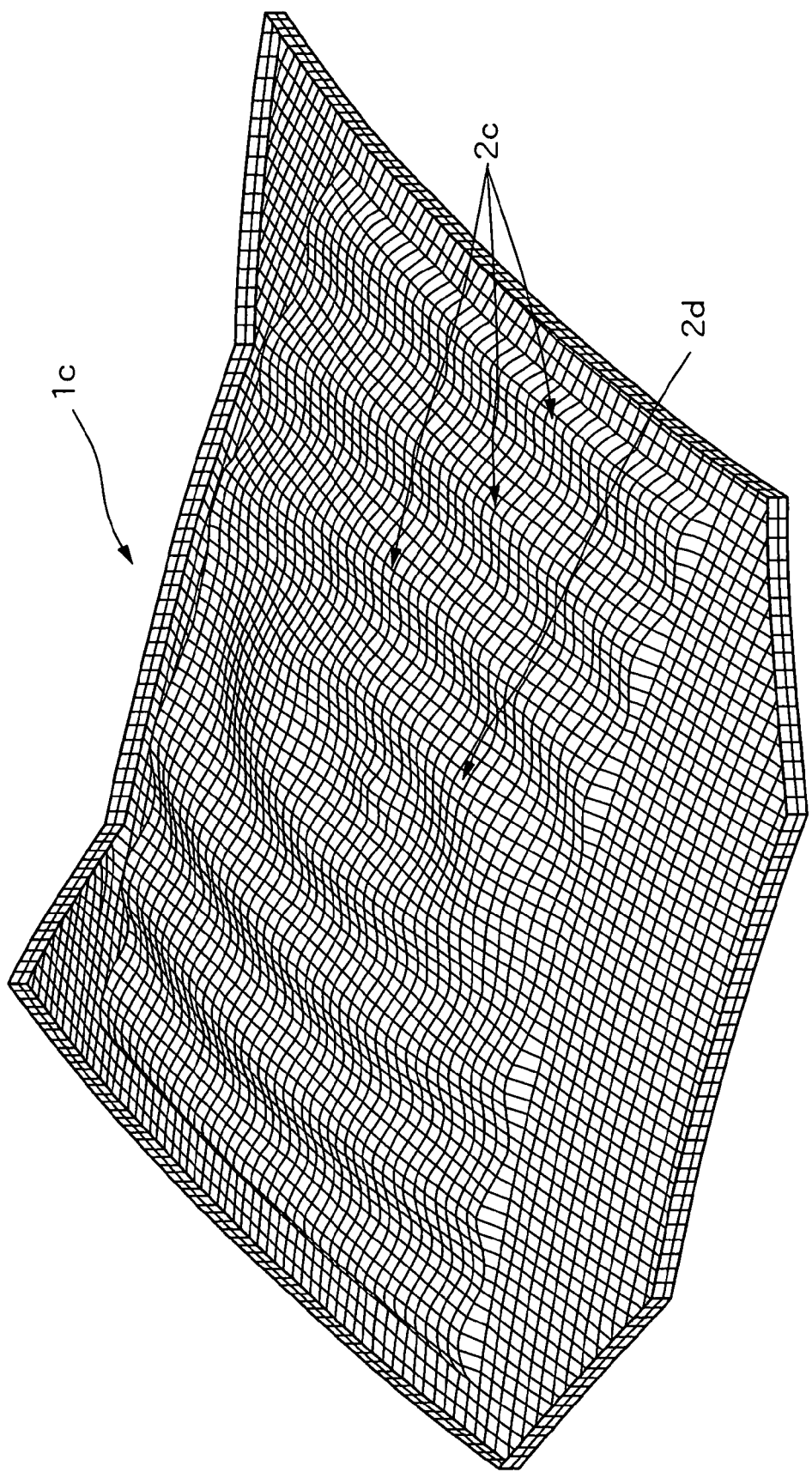
FIG. 5 is a perspective view showing still another example of the corrugated inner according to the present invention.

An inner 1c in FIG. 5 is provided with a plurality of corrugated bead 2c and 2d approximately parallel to each other and ovally all over the panel.

Figure 6:
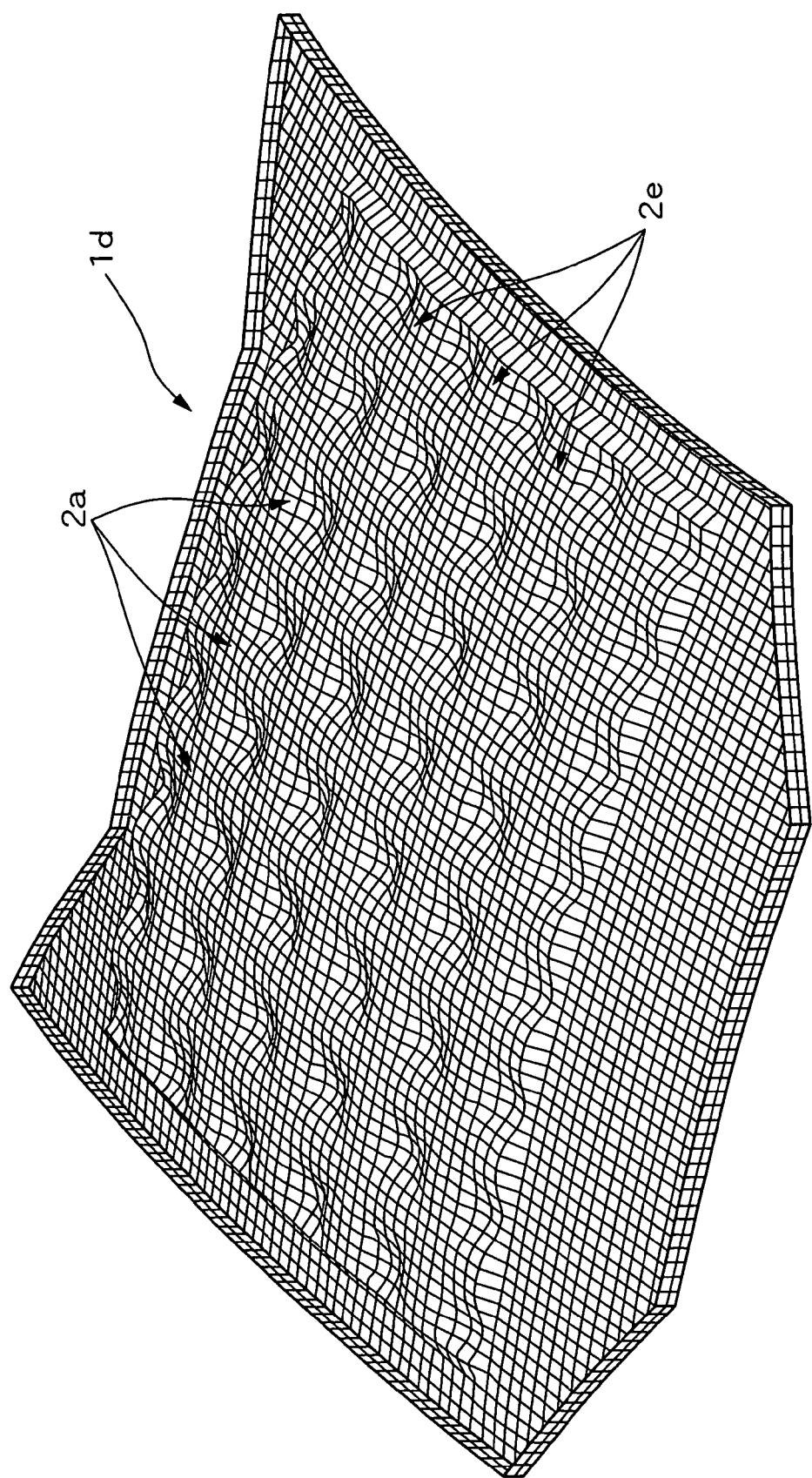
FIG. 6 is a perspective view showing yet another example of the corrugated inner according to the present invention.
Figure 7:
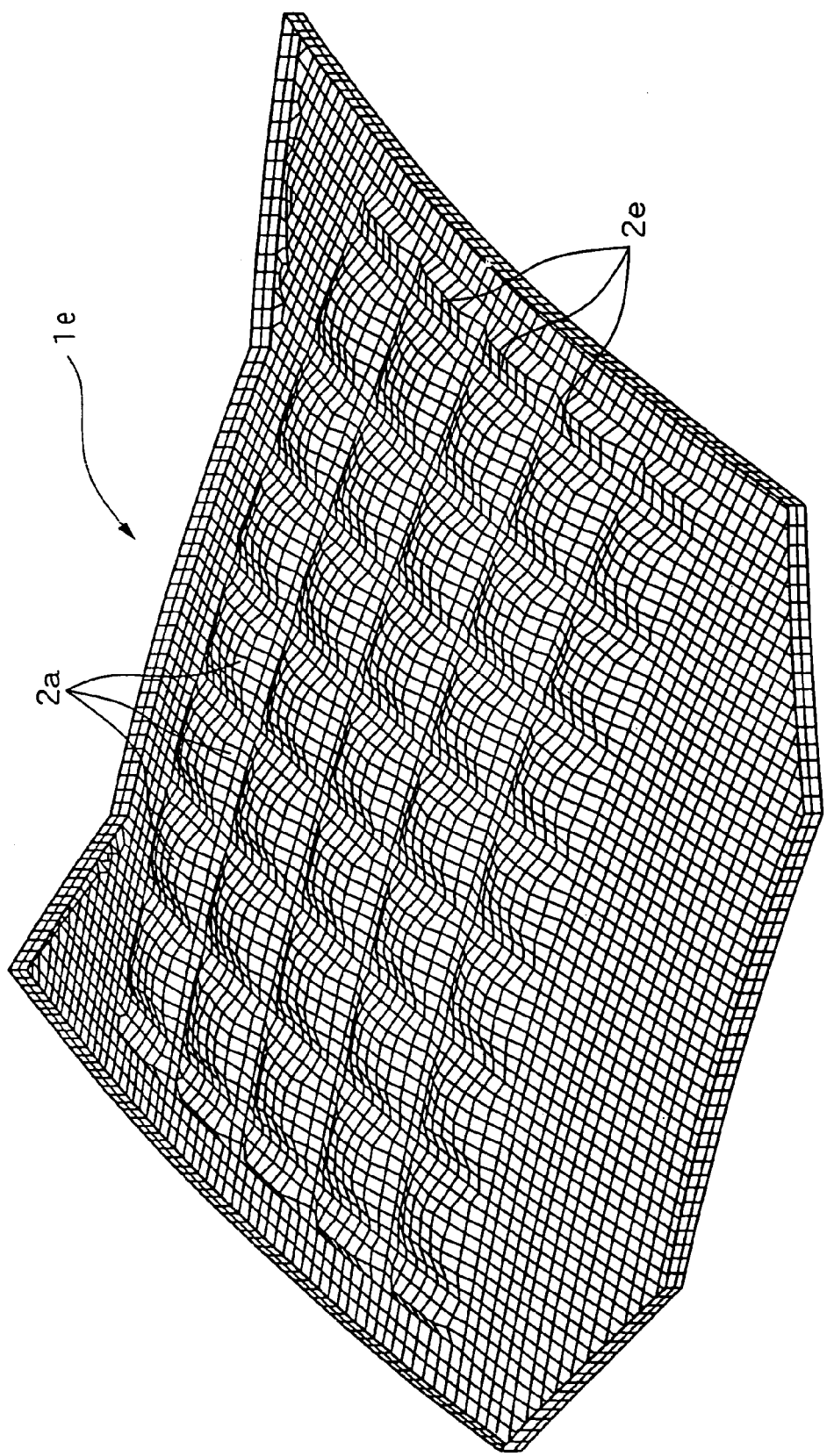
FIG. 7 is a perspective view showing still yet another example of the corrugated inner according to the present invention.

An inner 1d in FIG. 6 is provided with a plurality of corrugated beads 2a and 2e vertically and horizontally at right angles to each other to increase an adhesion area between the outer and the inner. Likewise, an inner 1e in FIG. 7 is provided with a plurality of corrugated beads 2a (vertical bead) and 2e (horizontal bead) vertically and horizontally at right angles to each other to decrease an adhesion area between the outer and the inner.

Figure 8:
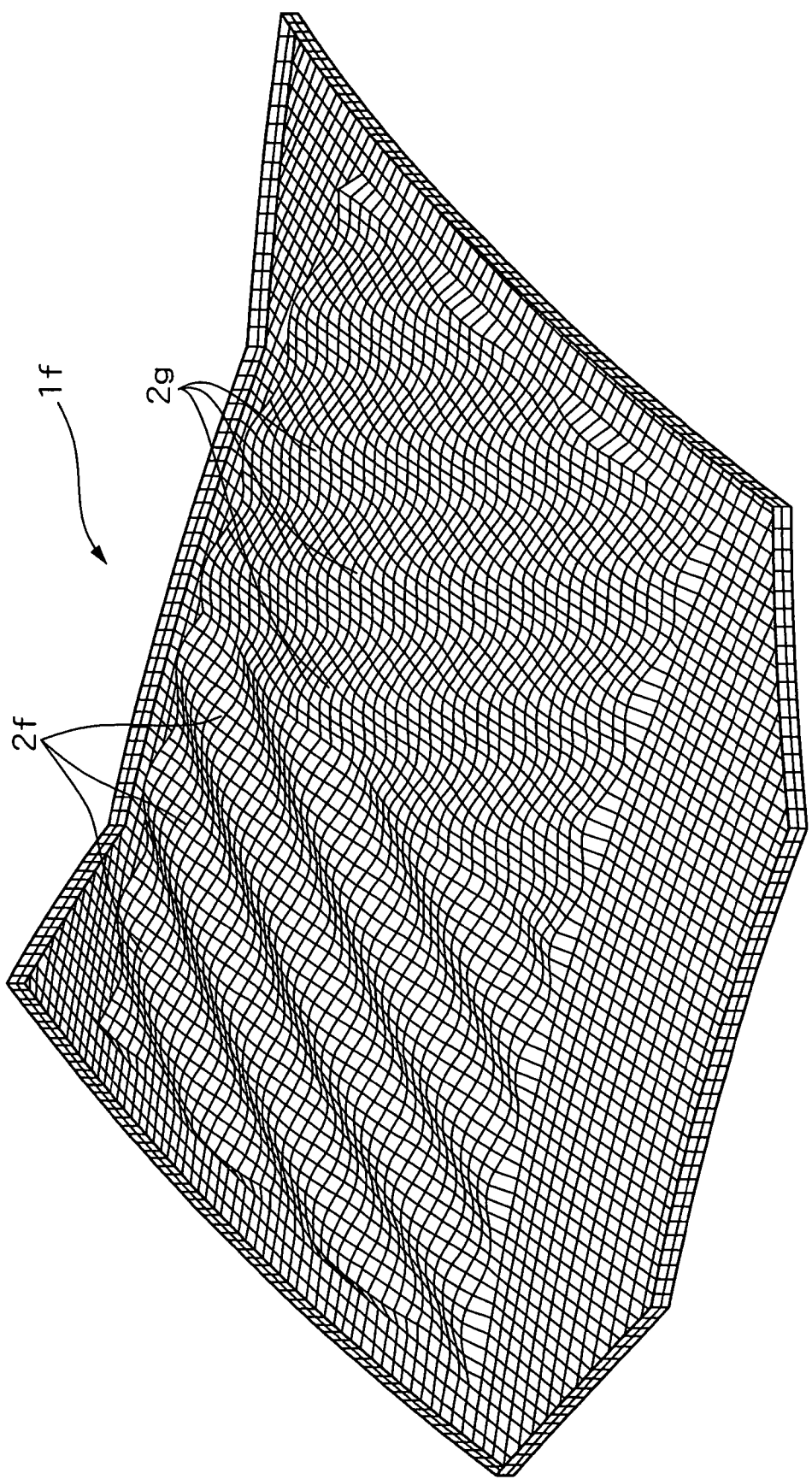
FIG. 8 is a perspective view showing yet still another example of the corrugated inner according to the present invention.
Figure 9:
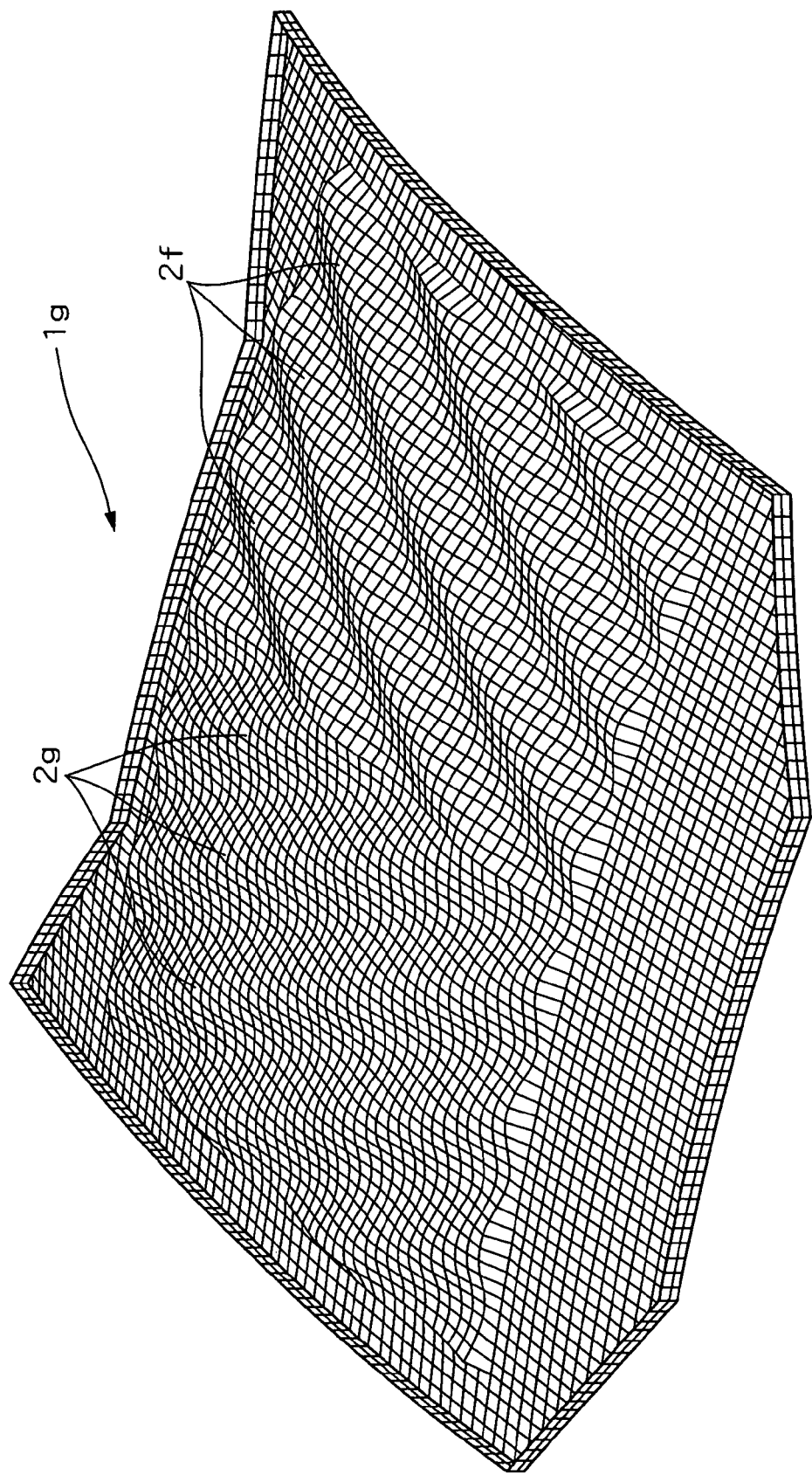
FIG. 9 is a perspective view showing still yet another example of the corrugated inner according to the present invention.

Inners 1f and 1g in FIGS. 8 and 9 indicate embodiments of approximately parallel distributing corrugated beads 2f and 2g in a V or U shape.

Figure 10:
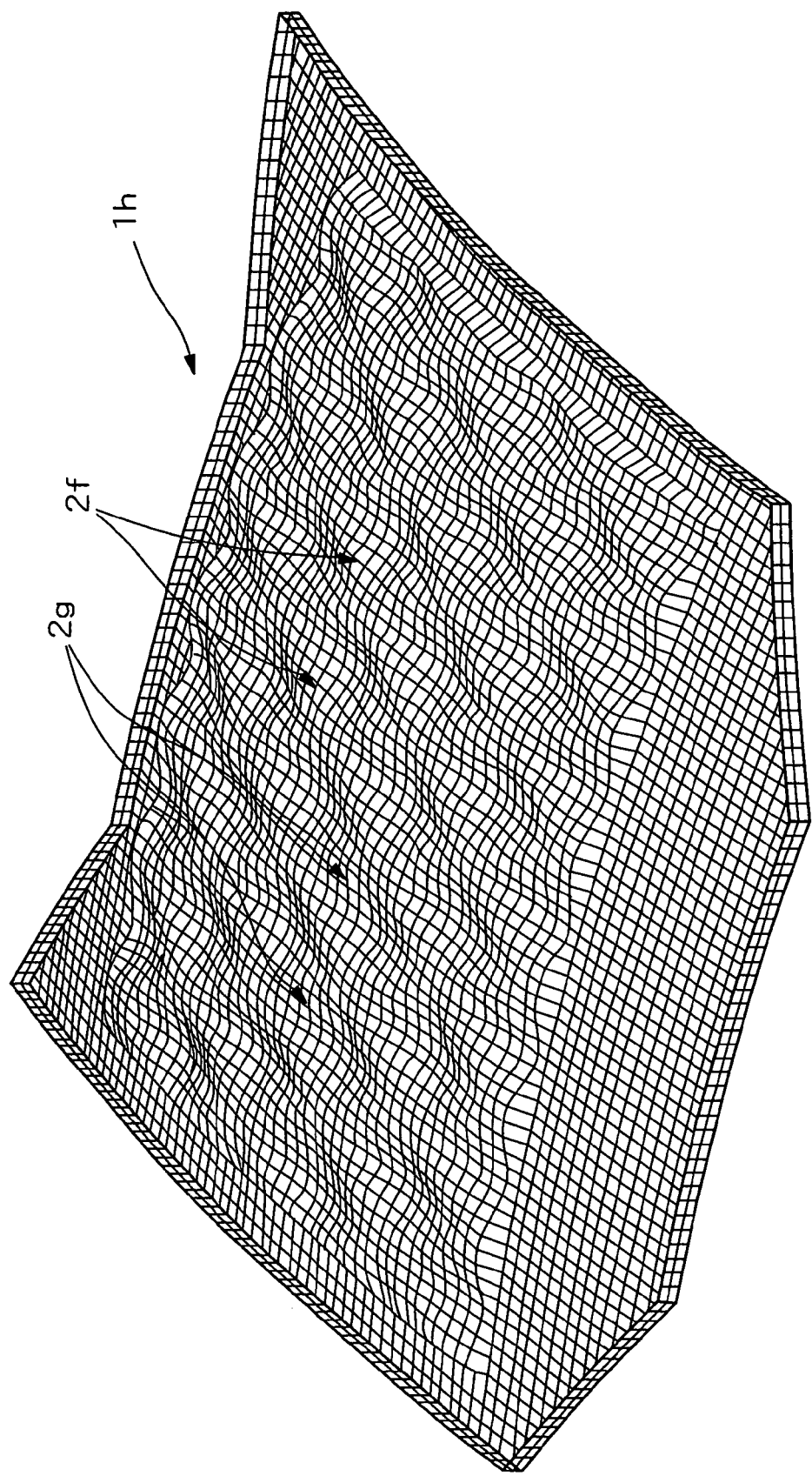
FIG. 10 is a perspective view showing finally, yet still another example of the corrugated inner according to the present invention.

An inner 1h in FIG. 10 shows an embodiment of crossing the oblique corrugated beads 2f and 2g in FIGS. 8 and 9 with each other.

(Hood Structure)

The following describes the hood structure as an integration of the inner and the outer.

The hood structure in FIG. 2 uses a resin layer 7 arranged on a top 5a of a corrugated bead 5 of the inner 1a. The resin layer works as an adhesive to join a flat top 3a of the corrugated bead 2a with the rear of an outer 4a formed in a gentle arc to be integrated into a closed sectional structure through spaces.

The inner 1a and the outer 4 are fastened together with the adhesive to be integrated into the hood structure by hemming a hem 4b around the outer 4.

The resin layer 7 can be provided with damping, sound-muffling (soundproof), shock-absorbing effects, and the like by selecting resin characteristics and types. In order to improve these effects, it may be preferable to fill the resin layer, a cushioning material, and the like not only at the top 5a of the corrugated bead 5, but also on the concave streak 6, i.e., into a gap between the inner 1a and the outer 4.

Figure 3:
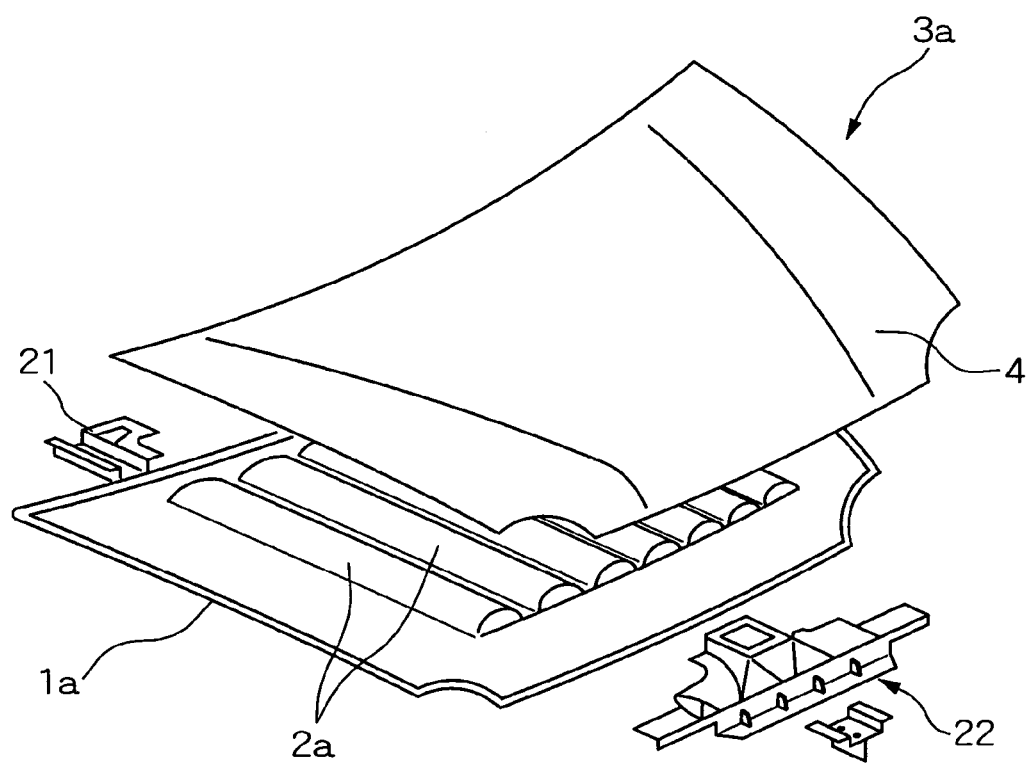
FIG. 3 is a perspective view of the corrugated hood structure in FIG. 2.

FIG. 3 is a perspective view of the corrugated hood structure in FIG. 2. In FIG. 3, the inner 1a and the outer 4 are integrated into a corrugated hood structure that can be locally reinforced by reinforcing members such as the hinge reinforcement 21 and the latch reinforcement 22 like the conventional cone-type hood structure and beam-type hood structure as mentioned above.

(Mechanism for Improving the Rigidity)

The following describes the mechanism for improving the panel's local bending rigidity and improving the rigidity as the inner or the corrugated hood structure by using the corrugated bead 2a and by corrugating the inner.

Firstly, the tension rigidity is a local rigidity with reference to the concentrated load at the center of the outer. The concentrated load perpendicularly acts on the outer surface from the outer to the inner.

Figure 11A:
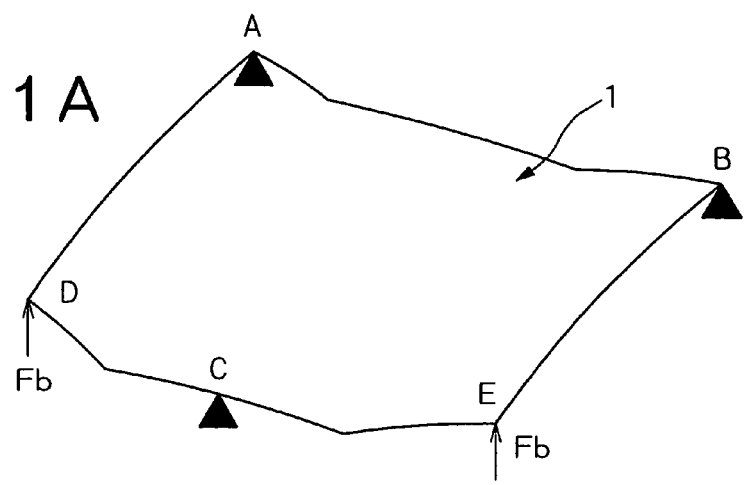
FIG. 11A is a perspective view showing a bending load and FIG. 11B is a perspective view showing a torsional load.

Secondly, the bending rigidity is a rigidity against a bending load applied to the hood structure shown in FIG. 11A. Bending load Fb mainly acts on the end of the hood in the vertical direction. The bending load Fb is a concentrated load acting on both ends D and E at the front based on three bearing points of the hood 1, namely, ends A and B at the driver seat side and the center C of the front. Bending rigidity Kb is a value defined as a ratio of the bending load Fb to displacement Ub ($Kb=Fb/Ub$) at loading points D and E.

Figure 11B:
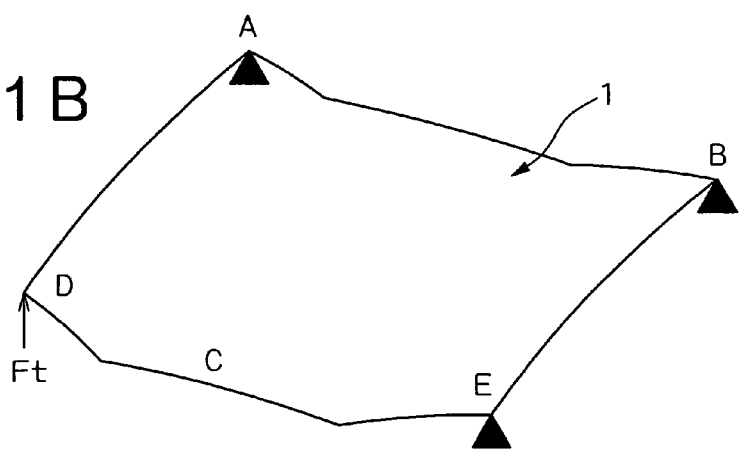

And thirdly, the torsional rigidity is a rigidity against a torsional load applied to the hood structure in FIG. 11B. The torsional load, represented as Ft, mainly acts on the hood front end in the vertical direction (from the bottom to the top). The torsional load Ft is a concentrated load acting on one end D at the front based on three bearing points of the hood 1, namely, ends A and B at the driver seat side and one end E of the front. Torsional rigidity Kt is a value defined as a ratio of the torsional load Ft to displacement Ut (Kt=Ft/Ut) at the loading point D.

Of these rigidities, the tension rigidity is characterized as follows. Compared to the cone-type hood structure, the corrugated hood structure provided with the corrugated inner increases local bending rigidities due to concaves and convexes at the center of the corrugated inner. In addition, the bonded area between the inner and the outer increases. The load transmission from the outer to the inner is distributed to a wide range, suppressing the displacement at loading points. As a result, the tension rigidity increases.

The bending rigidity is characterized as follows. Compared to the cone-type hood structure, the corrugated hood structure increases a cross sectional area effective for improving the bending rigidity due to the corrugated shape. As a result, the hood's bending rigidity increases.

Further, the torsional rigidity is characterized as follows. The closed sectional structure used for the cone-type hood structure and the corrugated hood structure helps improve the torsional rigidity. Basically, the closed sectional structure provides the torsional rigidity approximately twice as large as the conventional beam-type hood structure. However, concaves and convexes at the center of the corrugated inner act to slightly decrease the torsional rigidity. Accordingly, the torsional rigidity of the corrugated hood structure becomes equal to or slightly smaller than that of the cone-type hood structure. On the other hand, the closed sectional structure originally provides a high torsional rigidity and can sufficiently satisfy the design condition even if the original torsional rigidity slightly decreases.

In this manner, the corrugated hood structure according to the present invention is superior to the cone-type hood structure in the tension rigidity and the bending rigidity but is slightly inferior to the cone-type hood structure in the torsional rigidity. Since the design condition is fully satisfied, however, the corrugated hood structure according to the present invention can provide the hood structure having high rigidities in view of the hood design requirements.

(Mechanism to Improve the Head Impact Resistance for Protecting Pedestrians)

From the viewpoint of solving problems about an impact between the head and the hood for the purpose of protecting pedestrians, the corrugated inner can very satisfactorily absorb the head's kinetic energy and greatly decrease the HIC value. This is because of the following:

(a) Corrugation length p of the corrugated inner is defined to be a value approximate to the outside head diameter. When a head impact occurs, one corrugation approximately supports the head and generates deformation for gently catching the head. As a result, the second acceleration wave reduces to decrease the HIC value.

(b) When a head impact occurs, the outer and the inner cause a backlash vibration to disturb the head acceleration waveform. As a result, it is possible to greatly reduce the second acceleration wave to decrease the HIC value.

There may be generated a small clearance between the outer and the rigid object surface when the head impacts immediately above the engine, for example. In such case, it may be preferable to provide a reinforcing plate to the corresponding part of the corrugated inner to increase the local rigidity. This can improve the impact resistance and decrease the HIC value in exchange for a slight increase in the weight.

It may be preferable to apply the soft joint method between the outer and the inner to provide tops of the corrugated inner with local bonding sections in a cross-stitched or distributed manner. There is no sacrifice of a backlash vibration between the outer and the inner during a head impact from the viewpoint of the pedestrian protection. As a result, the head acceleration waveform is disturbed to enable the HIC value to be decreased.

When the spline-type inner is applied, a more realistic design becomes available in consideration for the arrangement of rigid parts such as an engine, a battery, a radiator, and the like in the engine room.

Figure 12:
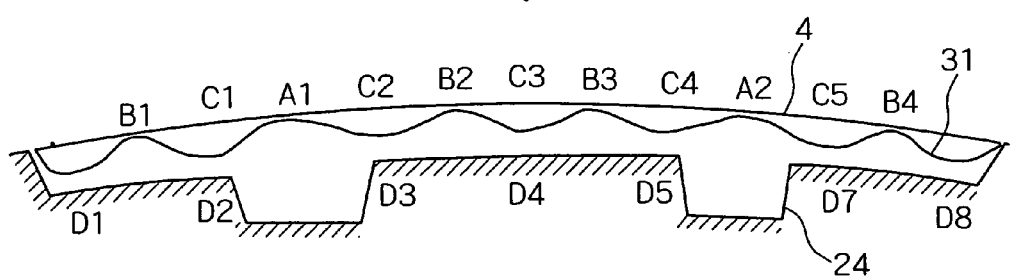
FIG. 12 shows a schematic sectional view of the corrugated hood structure using a spline-type inner along a car width direction at the hood center.

The design of the corrugated inner needs to consider the arrangement of rigid parts such as the engine, the battery, the radiator, and the like in the engine room. The arrangement of these parts largely depends on cars. The cross-sectional shape of the corrugated inner needs to be modified from a simple, regular form into a corrugated form with irregularly varying corrugation lengths, heights, and shapes. For this reason, the corrugated cross-sectional shape must be principally compliant with one as shown in FIG. 12 that can be defined by form functions capable of representing any three-dimensional forms such as a spline function. Here, let us define the inner having such corrugated shape according to a spline function as a spline-type inner that is assumed to be one mode of corrugated inners.

FIG. 12 shows a cross-sectional shape at a given cross section along the longer direction of the hood including an outer, a spline-type inner, and a rigid object surface in the engine room. If a consideration is made about the positional relationship between the spline-type inner and the rigid object surface, they need to be configured so that bottoms of the corrugations approximately evenly impact on the rigid object surface and that a reactive force from the rigid object surface propagates to the entire surface of the corrugated inner. At position B1, there is a small clearance between the outer and the rigid object surface to inevitably cause an impact between the head and the rigid object. The cross-sectional shape must be configured so that position B1 is evenly supported at bottoms D1 and D2 of the spline corrugation. The same applies to positions B2, B3, and B4. By contrast, at position A1, there is a sufficient clearance to cause no impact on the rigid object. In this case, the cross-sectional shape must be configured so that a sufficient corrugation length is ensured and position A1 is evenly supported at bottoms D2 and D3 of the spline corrugation. If the corrugation length is shortened and a plurality of corrugations is provided at this position, the inner's bending rigidity decreases along the car width direction. Consequently, displacements increase in the vertical direction to decrease the head impact resistance. One corrugation must be used to cover a distance from positions D2 to D3. The same applies to position A2. As long as the HIC value is small, there is no problem of providing allowable corrugations. With respect to a head impact at bottoms C1, C2, C3, C4, and C5 of the corrugation, a load is first transmitted to inner tops, and then is transmitted to the rigid object surface via the inner bottoms. The impact resistance becomes approximately the same as that for an impact on the tops. In this manner, the spline-type inner can provide the approximately constant head impact resistance independently of the arrangement of rigid objects in the engine room while such arrangement varies from one car to another.

The arrangement of rigid objects in the engine room is very complicated. Heights and lengths of spline corrugations need to flexibly vary in the car width direction and the longer direction of the car. Accordingly, the spline-type inner is shaped to be a complexly curved surface.

At a position that is subject to an insufficient clearance and an insufficient head impact resistance, it is preferable to provide the inner with a reinforcing plate, locally provide the spline-type inner with concaves and convexes (i.e., embossing finish), or overlap small corrugations in the longer direction of the hood. In this manner, it is possible to enhance the inner's local rigidity and improve the head impact resistance.

According to another feature of the invention, the corrugated hood structure comprising an outer panel made of steel and an inner panel made of aluminum alloy. This hood structure can provide lightweight and a high head impact resistance. It is possible to effectively decrease the HIC value especially for the adult head impact that requires a high head impact resistance.

Further, the cone-type hood structure may comprise an outer panel made of steel and an inner panel made of aluminum alloy. This hood structure can provide lightweight and a high head impact resistance. It is possible to effectively decrease the HIC value especially for the adult head impact that requires a high head impact resistance.

The hood of a large sedan, for example, needs to satisfy head impacts for both children and adults. The following clarifies that the light-weight and economical hood is preferably structured to comprise an outer made of steel and an inner made of aluminum alloy. According to a publicly known document (Okamoto, Concept of hood design for possible reduction in head injury, 14th ESV conference, 1994), it is known that an ideal head acceleration waveform causes the HIC value of approximately 1000 if the first acceleration wave is approximately 200 G. After conducting an analysis, we found that this condition is equivalent to the case where a child head impacts on the steel outer 0.7 mm thick. The HIC value becomes 1000.

It is possible to say that functions needed for the outer are increasing the first acceleration wave as much as possible, decreasing vertical displacements of the head as much as possible by means of the outer's absorption of an impact energy, and decreasing the second acceleration wave due to an impact between the inner and the rigid object surface. (It should be noted that the maximum plate thickness is approximately 0.7 mm for a steel plate. Exceeding this plate thickness causes an improper effect that only the first acceleration wave for a child head impact generates an HIC value exceeding 1000.) The weight and the membrane rigidity of the outer are necessary for improving energy absorption by the outer. A preferable material is steel from the economical viewpoint. An aluminum alloy is capable of weight saving and is equivalent to the steel in terms of the bending rigidity. However, the aluminum alloy is unsuitable as an outer material because its light weight bottlenecks adversely.

On the other hand, functions needed for the inner are absorbing an excess energy resulting from energies consumed for an impact between the head and the outer and decreasing the second acceleration wave due to a reactive force from a rigid object surface such as the engine. If the corrugated hood structure is deformed until the head touches the rigid object surface, the HIC value largely exceeds 1000. When the corrugated hood structure is assumed, a function required of the inner is to fully absorb the remaining energy by means of deformation of the bent inner within a specified clearance. In this case, a preferable material is the aluminum alloy capable of weight saving and providing a high bending rigidity. According to these reasons, the corrugated hood structure comprising the steel outer and the aluminum alloy inner provides light-weight and economical hoods for large sedans and the like that need to satisfy head impacts for both children and adults.

(Applicable Metals)

Metals used for the panel according to the present invention are appropriately selected from generally used Al alloy-plates, high-tension steel plates, and the like. However, the use of resin is impractical and is not applied to the panel according to the present invention. This is because the resin must be extremely thickened due to its characteristics such as the material strength in order to provide the rigidity required for the present invention.

The use of an Al alloy is preferable for further weight saving of the car body. The corrugated hood structure according to the present invention is fully applicable to high rigidity without using high-tension steel plates or specially high-tension Al alloys.

In consideration for this, it is preferable select materials for the inner and the outer according to the present invention for car bodies from relatively high-bearing general-purpose (standard) Al alloy plates such as AA or JIS standard compliant 3000, 5000, 6000, and 7000 series that are generally used for this type of panels. These Al alloy plates are manufactured by normal methods such as metal rolling and are appropriately subject to conditioning processes for use.

(Examples of Increasing Rigidities According to Problem 1)

We then conducted an FEM analysis for the panel structure according to the present invention and compared the bending rigidity, the torsional rigidity, and the tension rigidity of the corrugated hood structure according to the present invention with those of the conventional cone-type hood structure.

Table 1 shows an analysis result. Invention examples 1 through 8 correspond to examples in FIGS. 1 and 4 through 10, respectively. In Table 1, values for the bending rigidity ratio, the torsional rigidity ratio, and the tension rigidity ratio are represented with reference to the corresponding values each assumed to be 1 for the cone-type hood structure (comparative example 9).

The analysis model is assumed to be a normal sedan hood and comprises only an outer and an inner both made of Al alloy. The analysis model is a simple model configured to be a double-plate structure having double curvatures, i.e., a curvature of 3100 mm in a longer direction of the hood and a curvature of 4300 mm in a width direction. The outer has a plate thickness of 1.0 mm. The inner has a plate thickness of 0.8 mm.

Figure 15:
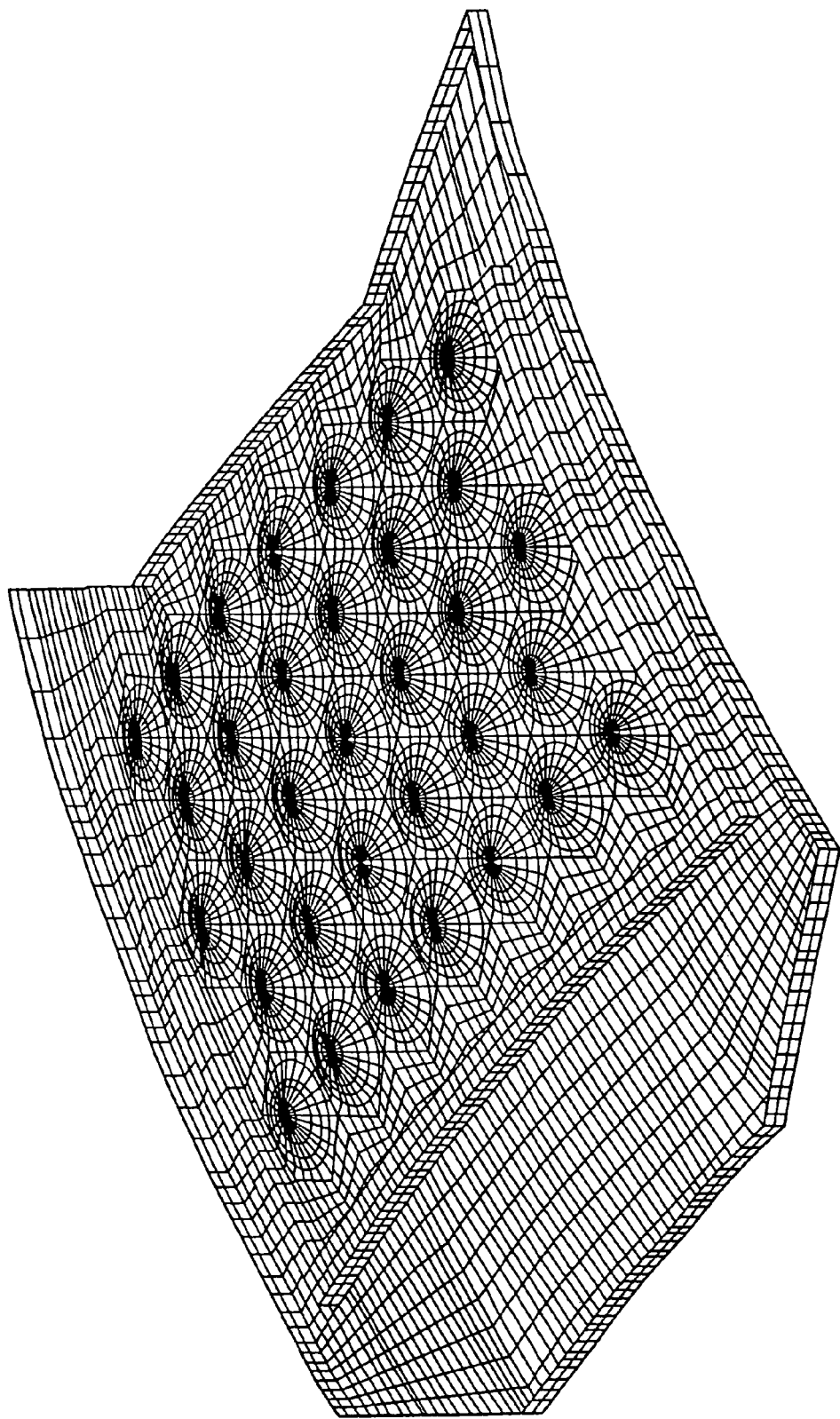
FIG. 15 is an analysis model diagram of the cone-type inner in FIG. 13B.

The cross-sectional shape of the inner according to the present invention follows a sine curve. The corrugation length is 174 mm. The corrugation height is 25 mm. The cross-sectional shape of a single cone in the cone-type inner has an outside bottom diameter of 140 mm and an outside top diameter of 20 mm. The cone height is 25 mm. There are evenly arranged 33 such cones at a 170 mm interval as illustrated by a perspective view in FIG. 15.

Invention example 1 (the vertically corrugated bead in FIG. 1) shows remarkable improvement in the tension rigidity and a 10% increase in the bending rigidity. The torsional rigidity is equivalent to that of the cone-type inner. On the whole, it can be understood that the rigidities increase greatly.

Like invention example 1, invention example 2 (the concentrically corrugated bead in FIG. 4) increases the tension rigidity and the bending rigidity but decreases the torsional rigidity 5%. As mentioned above, however, the cone-type hood structure provides the torsional rigidity twice as large as that of the conventional beam-type hood structure. It can be understood that the torsional rigidity of this invention example fully satisfies the design conditions and that, as a result, the rigidities increase greatly on the whole.

Invention example 3 (the ovally corrugated bead in FIG. 5) is approximately the same as invention example 2. It can be understood that the rigidities increase greatly on the whole.

Invention example 4 (the vertically and horizontally double corrugated bead in FIG. 6) increases the bonded area between the inner and the outer. Accordingly, it can be understood that the bending rigidity and the torsional rigidity slightly decrease but the tension rigidity increases.

Invention example 5 (the vertically and horizontally double corrugated bead in FIG. 7) decreases the bonded area between the inner and the outer. Accordingly, it can be understood that the bending rigidity and the tension rigidity increase.

Invention example 6 (the inverted V-shaped corrugated bead in FIG. 8) and invention example 7 (the V-shaped corrugated bead in FIG. 9) increase the bending rigidity and the tension rigidity 20%. It can be understood that the rigidities increase greatly on the whole.

Invention example 8 (the slantwise double corrugated bead in FIG. 10) increases the tension rigidity 10%. It can be understood that the rigidities increase greatly on the whole.

According to these results, the corrugated hood structure according to the present invention greatly increases the tension rigidity and the bending rigidity. As a result, it is possible to thin the inner or the outer for weight saving.

According to these results, the corrugated hood structure according to the present invention greatly increases the tension rigidity and the bending rigidity. As a result, the present invention can thin the inner or the outer for weight saving.

(Examples for Improving Head Impact Resistances According to Problem 2)

We built a simple analysis model concerning improvement of head impact resistances for pedestrian protection and examined effects of the corrugated hood structure. We made the examination under the conditions that the corrugated cross section is a sine wave and corrugations are distributed parallel to each other along a longer direction of the hood.

Figure 16:
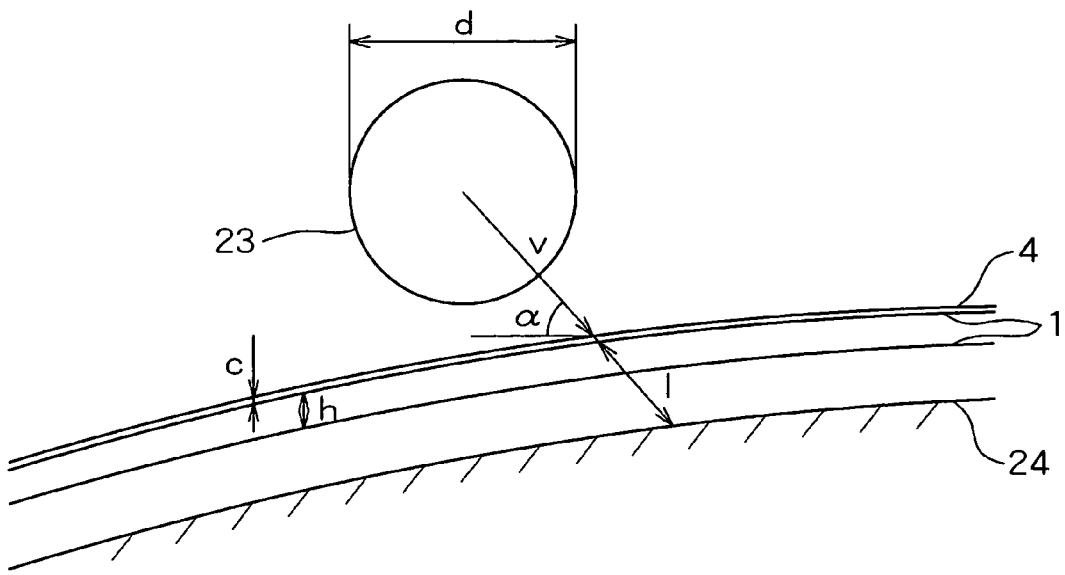
FIG. 16 is a schematic diagram (side view) showing a head impact model for the corrugated inner according to the present invention.
Figure 17:
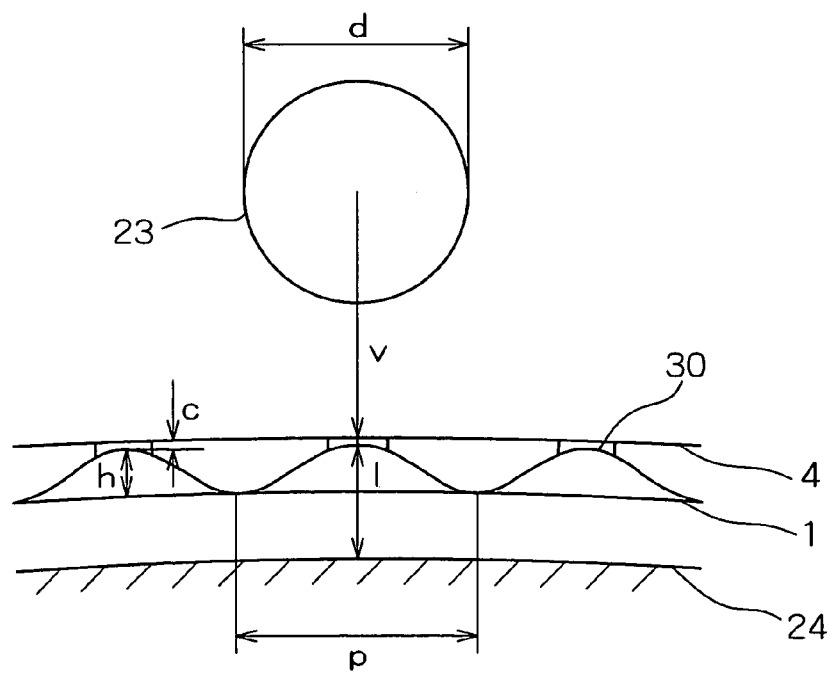
FIG. 17 is a schematic diagram (front view) showing the head impact model for the corrugated inner according to the present invention.
Figure 18:
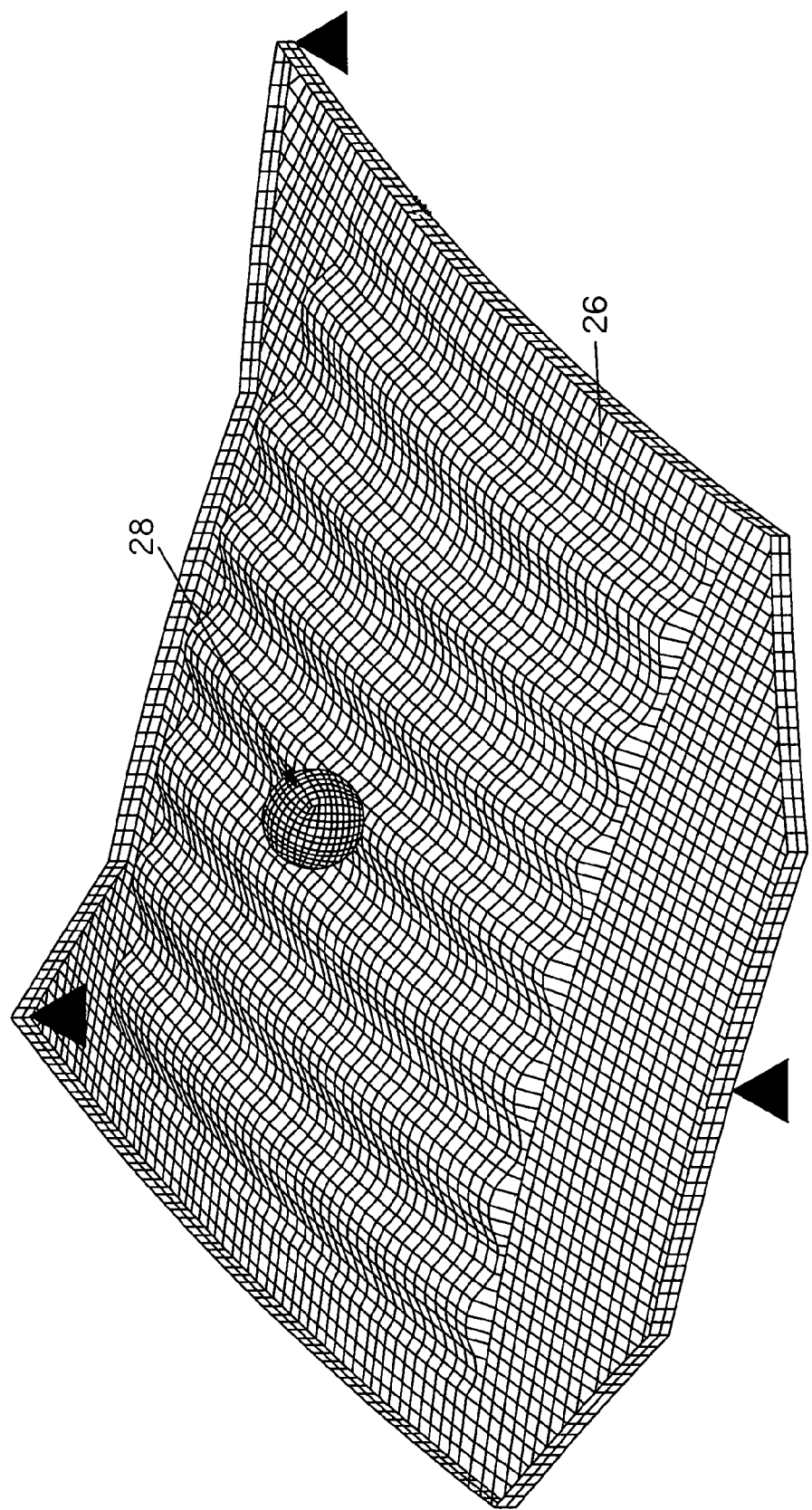
FIG. 18 is a model diagram (perspective view) showing the corrugated inner and the head model.

The analysis model is configured as follows. FIG. 16 is a side view schematically showing a pedestrian's head impact model for the corrugated inner according to the present invention. FIG. 17 is a front view of the model. FIG. 18 is a perspective view showing the head impact model in FIGS. 16 and 17.

In FIGS. 16 and 17, the reference numeral 1 denotes a corrugated inner, 4 an outer, 23 a pedestrian's head, 24 a rigid object surface, and 30 an adhesive such as resin. With respect to measurements, the reference symbol d represents an outside head diameter, V an impact speed, α an impact angle, L an interval between the outer and the rigid object surface along an impact direction, c an adhesive thickness, h a corrugation height of the corrugated inner, and p a corrugation length of the corrugated inner.

Figure 19:
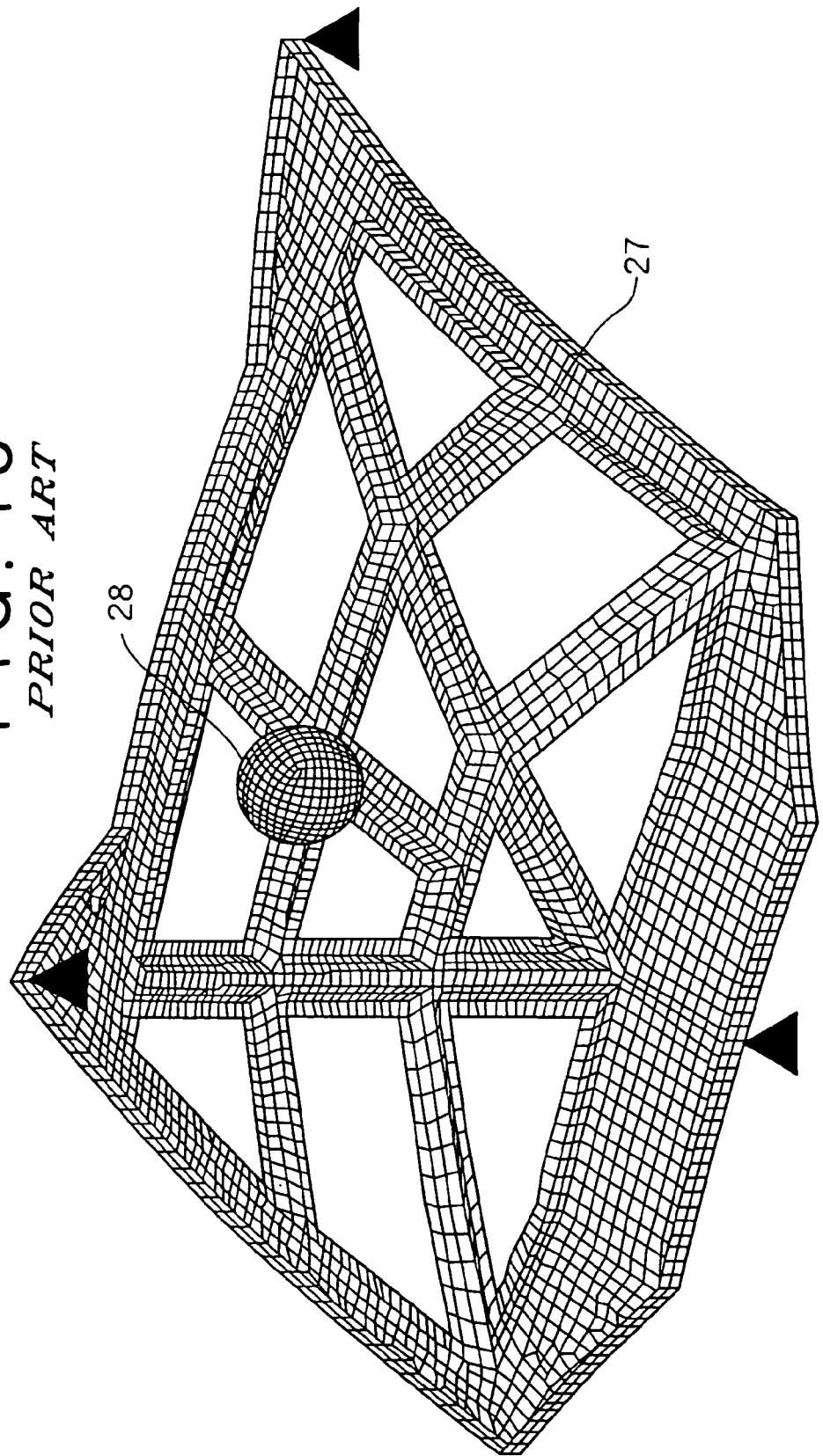
FIG. 19 is a model diagram (perspective view) showing the conventional beam-type inner and the head model.
Figure 20:
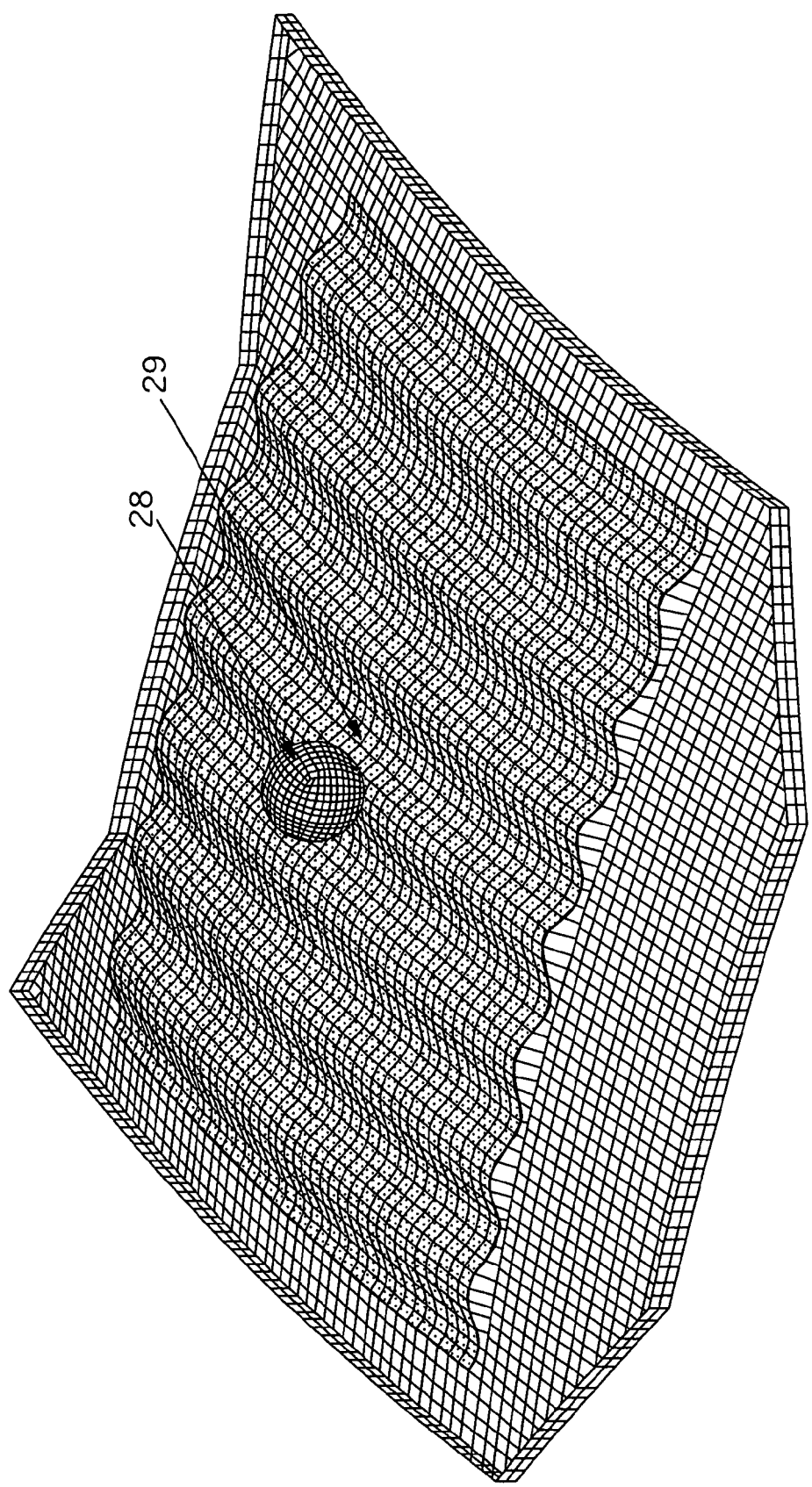
FIG. 20 is a perspective view showing an example of a reinforced section of the corrugated inner according to the present invention.
Figure 21:
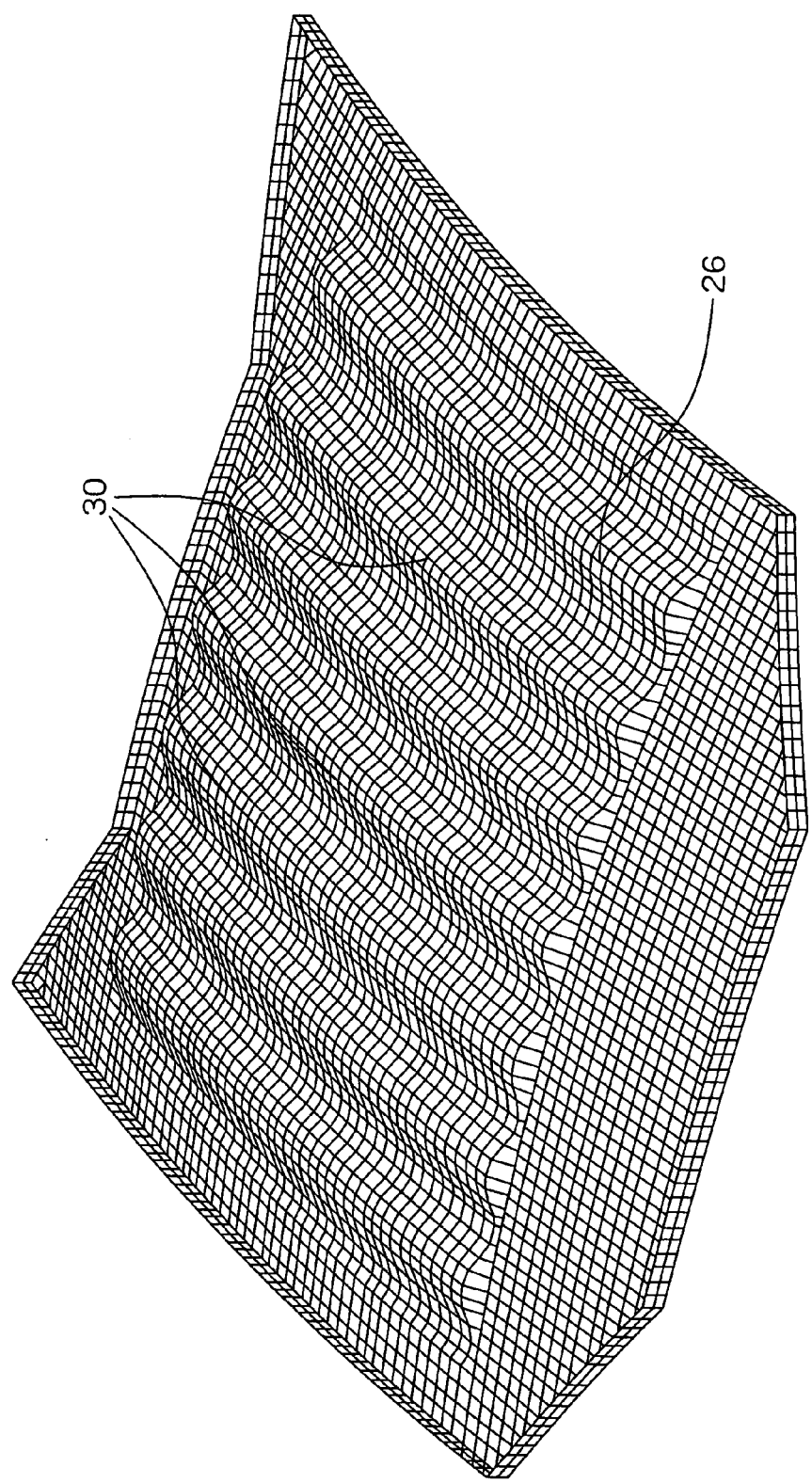
FIG. 21 is a perspective view showing an example of a bonded part between the outer and the corrugated inner according to the present invention.

FIG. 19 shows a beam-type inner model as a comparative example together with a pedestrian's head model. FIG. 20 shows a model of the corrugated inner provided with a locally reinforced plate in order to decrease the HIC value to be described later. FIG. 21 shows an example of arranging bonding sections on the corrugated inner.

Table 2 lists analysis conditions for the pedestrian's head models in FIGS. 16, 20, and 21. Table 3 lists shapes of the pedestrian's head models.

TABLE 1

Figure 13A:
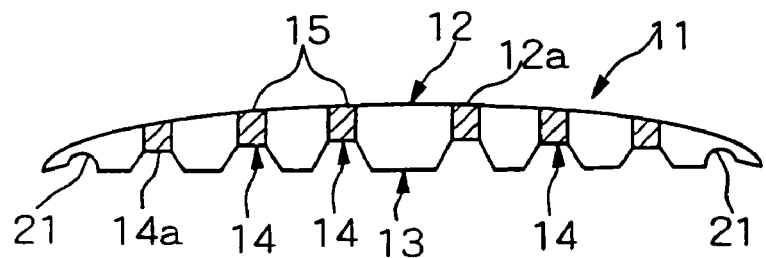
FIG. 13A is a longitudinal sectional view of the cone-type hood structure and FIG. 13B is a plan view of the cone-type inner.
Figure 13B:
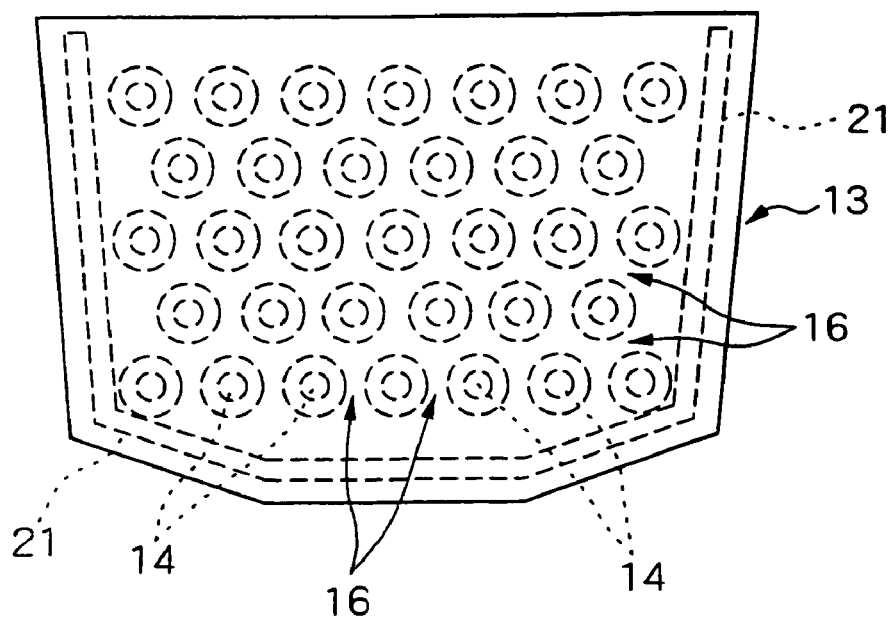
Figure 14:
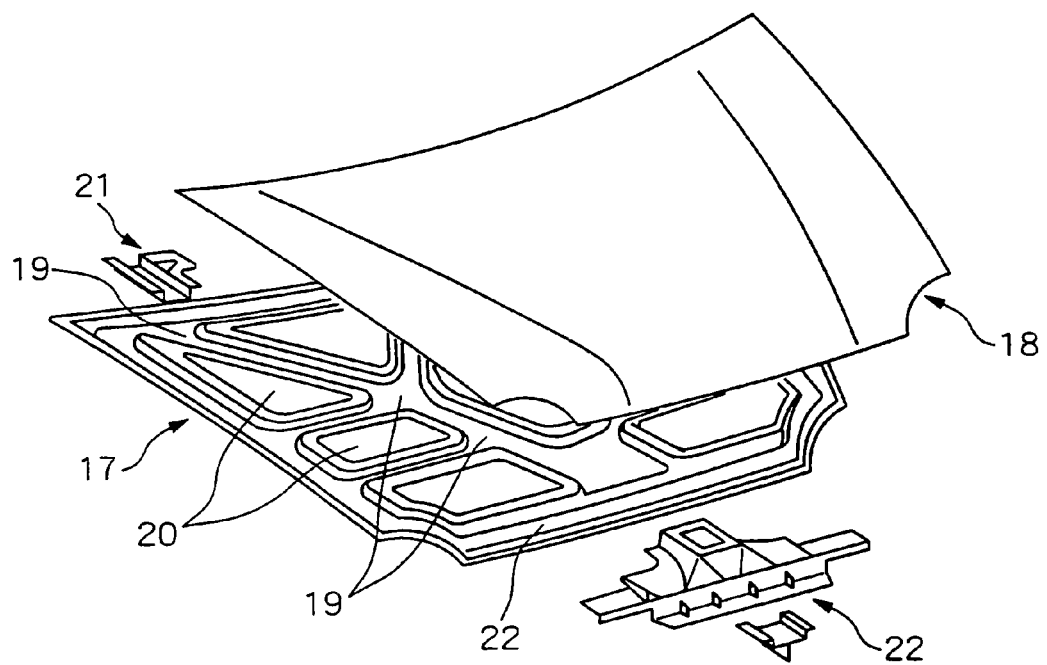
FIG. 14 is a perspective view showing a conventional beam-type hood structure.

| | | Inner panel shape | | | Rigidity of the hood structure | | |
|---|---|---|---|---|---|---|---|
| | | | Bead cross section | | | | |
| Legend | No. | Arrangement of corrugated beads | Corrugation length (mm) | Corrugation height (mm) | Bending rigidity ratio | Torsional rigidity ratio | Tension rigidity ratio |
| In- | 1 | FIG. 1 (vertical) | 174 | 25 | 1.1 | 1.0 | 1.4 |
| vention | 2 | FIG. 4 (concentric) | 174 | 25 | 1.1 | 0.95 | 1.2 |
| example | 3 | FIG.5 (oval) | 174 | 25 | 1.1 | 1.0 | 1.1 |
| | 4 | FIG. 6 (double corrugated) | 174 | 25 | 0.9 | 0.7 | 1.1 |
| | 5 | FIG.7 (double corrugated) | 174 | 25 | 1.1 | 0.9 | 1.1 |
| | 6 | FIG.8 (inverted V-shaped) | 174 | 25 | 1.2 | 0.95 | 1.2 |
| | 7 | FIG. 9 (V-shaped) | 174 | 25 | 1.2 | 0.8 | 1.2 |
| | 8 | FIG. 10 (double corrugated) | 174 | 25 | 1.0 | 0.75 | 1.1 |
| Comparative example | 9 | FIG. 13 (conical) Outside bottom diameter 140 mmφ Outside top diameter 20 mmφ Height 25 mm | | | 1.0 | 1.0 | 1.0 |

TABLE 2

| Item | | Adult | Child |
|---|---|---|---|
| Weight | W | 4.8 kg | 2.5 kg |
| Outside head diameter | d | 165 mm | 130 mm |
| Impact angle | α | 65 degrees | 50 degrees |
| Impact speed | v | 40 km/h | 40 km/h |
| Skin thickness | ts | 7.5 mm | 7.5 mm |
| Skin's elastic modulus | Es | 2 kg/mm$^2$ | 3 kg/mm$^2$ |

TABLE 3

| Item | | Corrugated hood structure | | | Beam-type hood structure | |
|---|---|---|---|---|---|---|
| Head model | Unit | Child | 1.27 times | Adult | Child | Adult |
| Outside head diameter d | mm | 130 | 165 | 165 | 130 | 165 |
| Corrugation height h | mm | 25 | 32 | 32 | | |
| Corrugation length p | mm | 165 | 210 | 165 | | |
| Clearance between outer and inner | mm | 29 | 29 | 29 | 29 | 29 |
| Bonding section thickness c | mm | 4 | 4 | 4 | 4 | 4 |
| Outer plate thickness | mm | 1.0 | 1.27 | 1.0 | 1.0 | 1.0 |
| Inner plate thickness | mm | 0.8 | 1.02 | 0.9 | 0.8 | 0.9 |
| Reinforced plate thickness for the inner | mm | 0.5 | 0.64 | 0.45 | | |
| h/d | | 0.19 | 0.19 | 0.19 | | |
| p/d | | 1.27 | 1.27 | 1.0 | | |

The following points are considered for the analysis model.

(a) It is difficult to build a detailed head impact model on the assumption of actual objects. The head is formed into a spherical head model. The car body is formed into a simple model comprising a hood structure and a rigid object surface.

(b) The rigid object surface simulates rigid objects including an engine that are difficult to be modeled in the engine room. The rigid object surface is curved parallel to the outer and provides clearance L in the impact direction. Car parts such as a fender, a window shield, and a suspension are not modeled.

(c) The hood model is intended for a normal sedan and comprises the inner of a 5000-series aluminum material and the outer of a 6000-series aluminum material. The hood is provided as a simple model configured to be an elastoplastic, double corrugated structure having double curvatures, i.e., the curvature of 3100 mm in the longer direction of the hood and the curvature of 4300 mm in the width direction.

(d) The bonding section between the outer and the inner is not modeled. Thickness c of the bonding section is modeled to allow a gap. Three black triangles in FIGS. 18 and 19 work as supporting sections. The other positions are not restricted. The hood structure impacts on a head to deform greatly. An impact section impacts on the rigid object surface.

(e) The head models follow child and adult head models indicated in the EEVC/WG10 requirements. The heads are simply modeled as rigid spheres whose outside peripheries are covered with a skin having an even thickness. We used an elastic material for the skin and determined its elastic modulus so that an acceleration response satisfies a specified range during a drop test requested by EEVC/WG10. Table 2 lists the physical values.

(f) We determined the height, the length, the plate thickness, etc. of the corrugated inner after detailed examinations from the viewpoint of decreasing the HIC value. We first paid attention to a child head that generates a small kinetic energy and does not require severe impact conditions. After various examinations, we determined the values in the table for dimensions of the corrugated hood structure.

The following similarity rule takes effect in an impact problem. Let us assume that two similar structures are subject to the same impact speed and are characterized by the same physical values such as an elastic modulus, a yield stress, a gravity, and the like. Then, an acceleration response occurring at a specific position of the structures is inversely proportional to a scale ratio. The larger structure produces a smaller acceleration.

When the child analysis model is expanded to the adult analysis model, both are subject to the same impact speed while impact angles differ. Assuming that the similarity rule is applicable, let us multiply the corrugated hood structure geometry by a ratio of outside head diameters (a scale ratio of 1.27 times) to determine the corrugated hood structure for the adult head impact model. Then, the head acceleration should reduce to 0.79 times to decrease the HIC value. However, the same clearance is used for both. The similarity rule cannot be applied as is. On the contrary, the HIC value tends to increase. Here, we conducted several numerical analyses for the remaining parameters to determine a shape for the adult head impact.

First, the corrugation height is multiplied by the scale ratio. Next, the corrugation length and the outer plate thickness are set to the same as the dimensions for the child head impact. The inner plate thickness is increased slightly. Table 3 lists dimensions for the adult head impact. The same corrugation length is used for the following reason. When the hood is designed, the child head impact causes a problem ahead of WAD1500, and the adult head impact causes a problem behind WAD1500. If a constant corrugation length is ensured in the boundary area of WAD1500, the formal discontinuity can be avoided. This is favorable to the design.

(g) The beam-type hood structure is based on the corrugated hood structure and employs a beam shape only for the inner structure. The cross-sectional shape of the frame is approximately configured to be trapezoidal with reference to existing design examples.

(1) EXAMPLE 1

Figure 22:
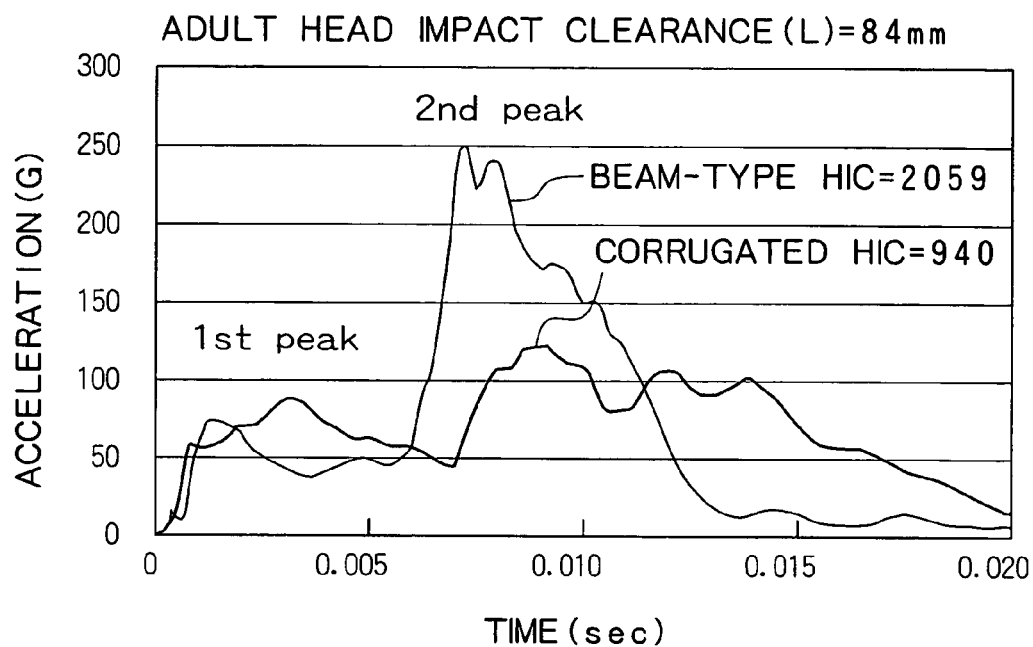
FIG. 22 is an explanatory diagram showing head acceleration waveforms for the beam-type hood structure and the corrugated hood structure.

Comparison between the Beam-Type Hood Structure and the Corrugated Hood Structure FIG. 22 shows analysis results of head impacts on the beam-type hood structure and the corrugated hood structure. The adult head model is used. There is 84 mm clearance L between the outer and the rigid object surface along the impact direction. An impact position is set to the center of the hood as shown in FIGS. 18 and 19. From FIG. 22, we can find the following. The beam-type hood structure yields the HIC value of 2059. The corrugated hood structure greatly decreases the second acceleration wave. As a result, the HIC value greatly decreases to 940. The sine shape of the corrugated inner is suitable for absorbing an impact during the head impact. The head impact causes a backlash vibration between the outer and the inner to disturb the head acceleration waveform. This decreases the peak value and greatly decreases the HIC value.

(2) EXAMPLE 2

Bonding the Corrugated Inner to the Outer

As analysis models, the outer and the inner are modeled to leave a 4 mm gap at the bonding section. Actually, the bonding section needs to be minimized to provide an optimal tension rigidity for the hood. After examinations, we confirmed the following. In order not to hinder a backlash vibration, the contact cross-sectional shape preferably has a relatively limited area. As shown in FIG. 21, it is preferable to arrange the bonding sections on tops of the corrugated inner in a cross-stitched or distributed manner using very soft, spongy adhesive. We also confirmed the following tendency. When the cross sectional area of the bonding section or the adhesive rigidity increases, the outer and the inner are integrated to be vibrated easily, thus eliminating a backlash vibration. As a result, the second acceleration wave increases to increase the HIC value.

(3) EXAMPLE 3

Preferred Ranges of Corrugation Length p and Corrugation Height h

Figure 23:
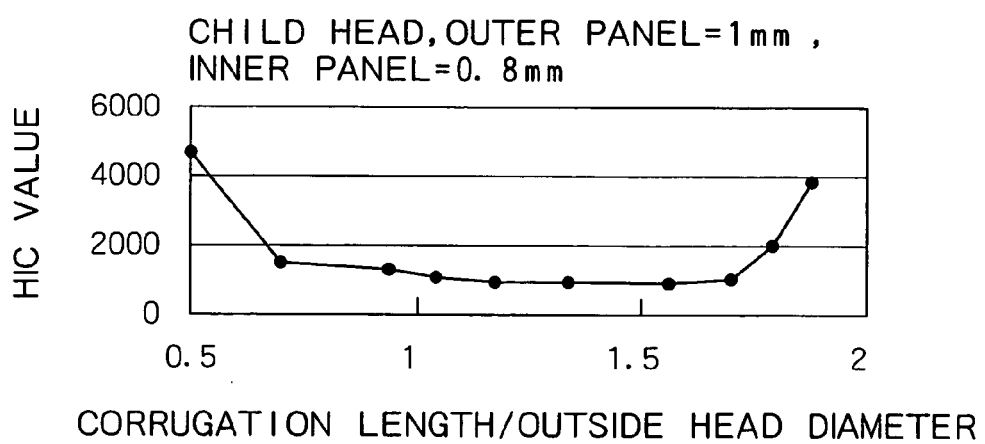
FIG. 23 is an explanatory diagram showing effects of corrugation lengths for the corrugated hood structure according to the present invention on HIC values.
Figure 24:
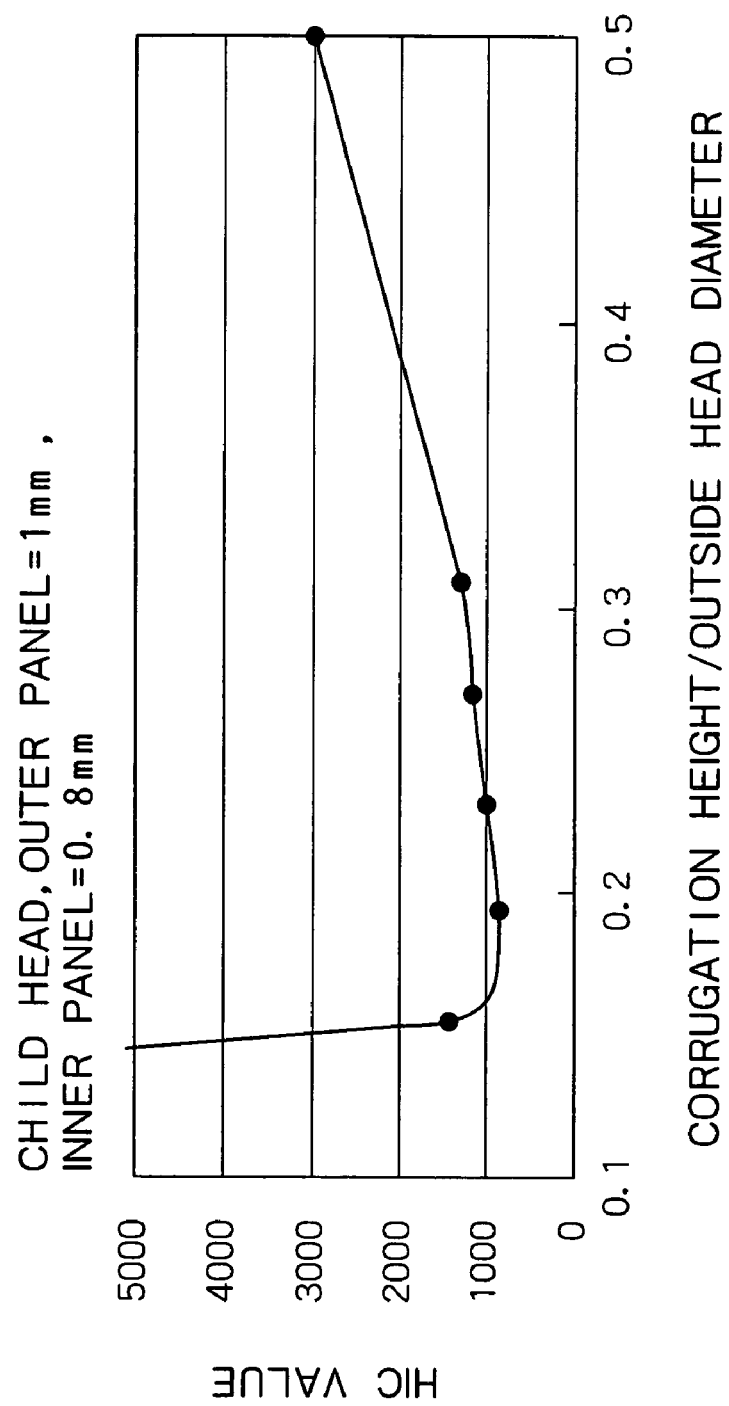
FIG. 24 is an explanatory diagram showing effects of corrugation heights for the corrugated hood structure according to the present invention on HIC values.

We investigated an effect of the corrugation length and the corrugation height of the corrugated inner on HIC values. The outer plate thickness is set to 1 mm. The inner plate thickness is set to 0.8 mm. With respect to analysis results of the child head impact, FIG. 23 shows an effect of the corrugation length on HIC values. FIG. 24 shows an effect of the corrugation height on HIC values. According to FIG. 23, we can formulate a preferable range of corrugation length p effective for decreasing the HIC value as follows using outside head diameter d.

$0.7 < p/d < 1.7$

According to FIG. 24, we can formulate a preferable range of corrugation height h as follows also using outside head diameter d.

$0.15 < h/d < 0.4$

If the corrugation length p is smaller than this range, the bending rigidity of the corrugated inner increases along the longer direction of the hood. On the contrary, the bending rigidity decreases along the width direction of the hood. This decreases the inner rigidity in case of the head impact and increases the HIC value. If the corrugation length p is greater than this range, the bending rigidity increases along the width direction of the hood. On the contrary, the bending rigidity decreases along the longer direction of the hood. This decreases the inner rigidity in case of the head impact and increases the HIC value. In this manner, there is a preferable range for corrugation length p. The range preferably covers approximate values with reference to the outside head diameter. This is because of the following fact. In case of the head impact, the structure uses approximately one corrugation to support the head and deforms to softly catch the head. As a result, the HIC value can be decreased.

If the corrugation height h is smaller than the above-mentioned range, the corrugated inner is subject to an insufficient local bending rigidity. It is impossible to absorb a head impact energy. The head impacts on the rigid object surface to increase the HIC value. If the corrugation height h is greater than the range, the corrugated inner is subject to an excess local bending rigidity. Since the hood rigidity is too high, the HIC value increases. In this manner, there is also a preferable range for corrugation height h. It is preferable to design a cross-sectional shape of the corrugated inner based on the above-mentioned preferable ranges.

If the clearance is constant, the HIC value for the adult head impact increases in comparison with the HIC value for the child head impact. In this case, however, the preferable range of corrugation heights is considered to be almost the same as that for the child head impact.

(4) EXAMPLE 4

Effect of Head Impact Positions

Figure 25:
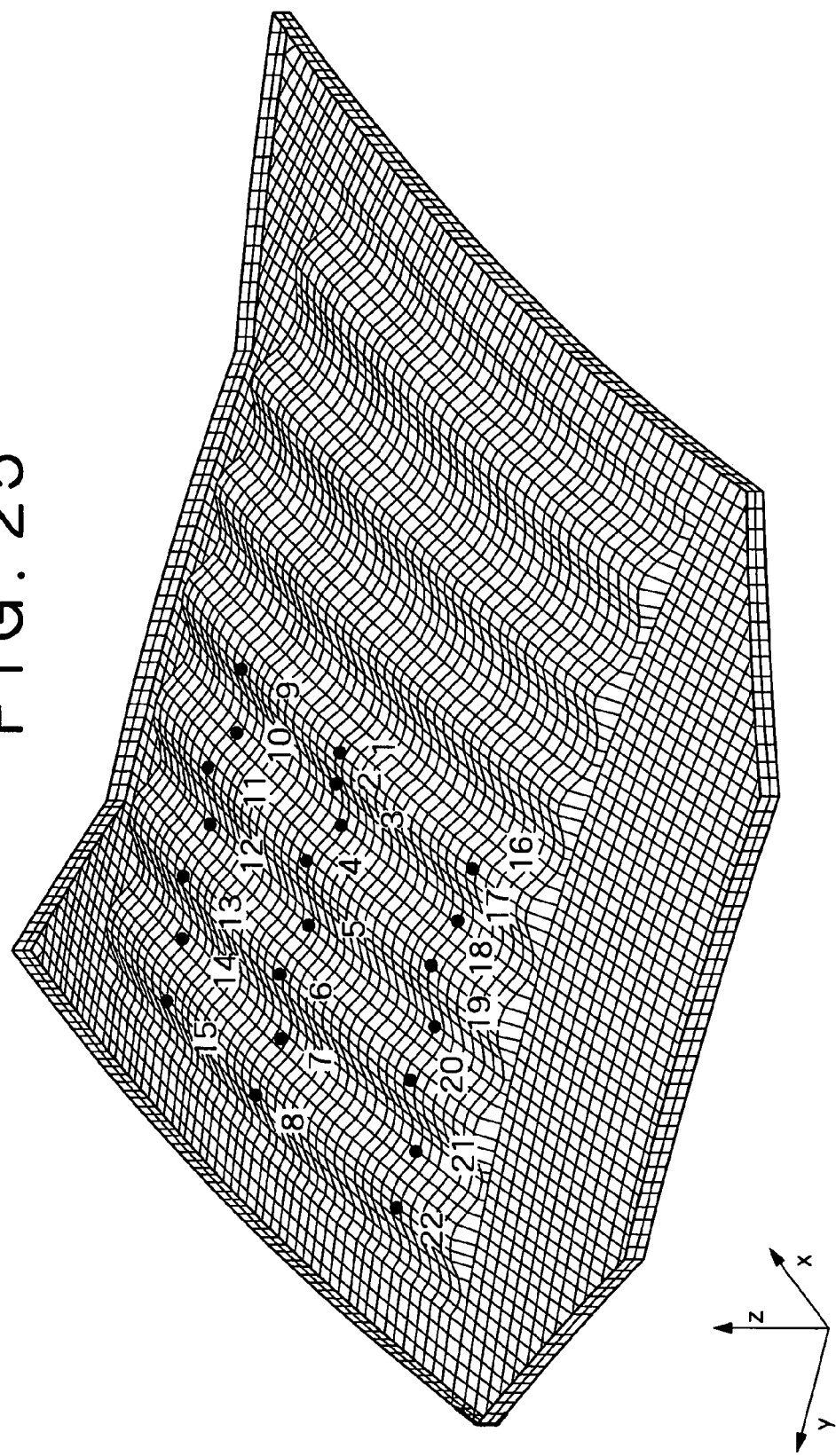
FIG. 25 is a perspective view of the corrugated hood structure showing head impact positions.

FIG. 25 shows head impact positions for the child head impact under the condition of 75 mm clearance L between the outer and the rigid object surface. Table 4 lists HIC values for the corresponding impact positions. From this table, it can be understood that the HIC values are approximately constant even if the head impact positions vary. The uniformity of HIC values for impact positions is a very useful feature of the corrugated hood structure.

TABLE 4

EFFECTS DUE TO IMPACT POINT FOR HIC_VALUE CHILD_HEAD, CLEARANCE_L = 75 MM

| POINT | HIC |
| --- | --- |
| 1 | 820 |
| 2 | 947 |
| 3 | 757 |
| 4 | 903 |
| 5 | 820 |
| 6 | 882 |
| 7 | 799 |
| 8 | 926 |
| 9 | 890 |
| 10 | 1106 |
| 11 | 978 |
| 12 | 1105 |
| 13 | 892 |
| 14 | 984 |
| 15 | 1011 |
| 16 | 964 |
| 17 | 968 |
| 18 | 985 |
| 19 | 1013 |
| 20 | 1043 |
| 21 | 1016 |
| 22 | 1036 |

(5) Relationship between an HIC Value and Clearance L

Figure 26:
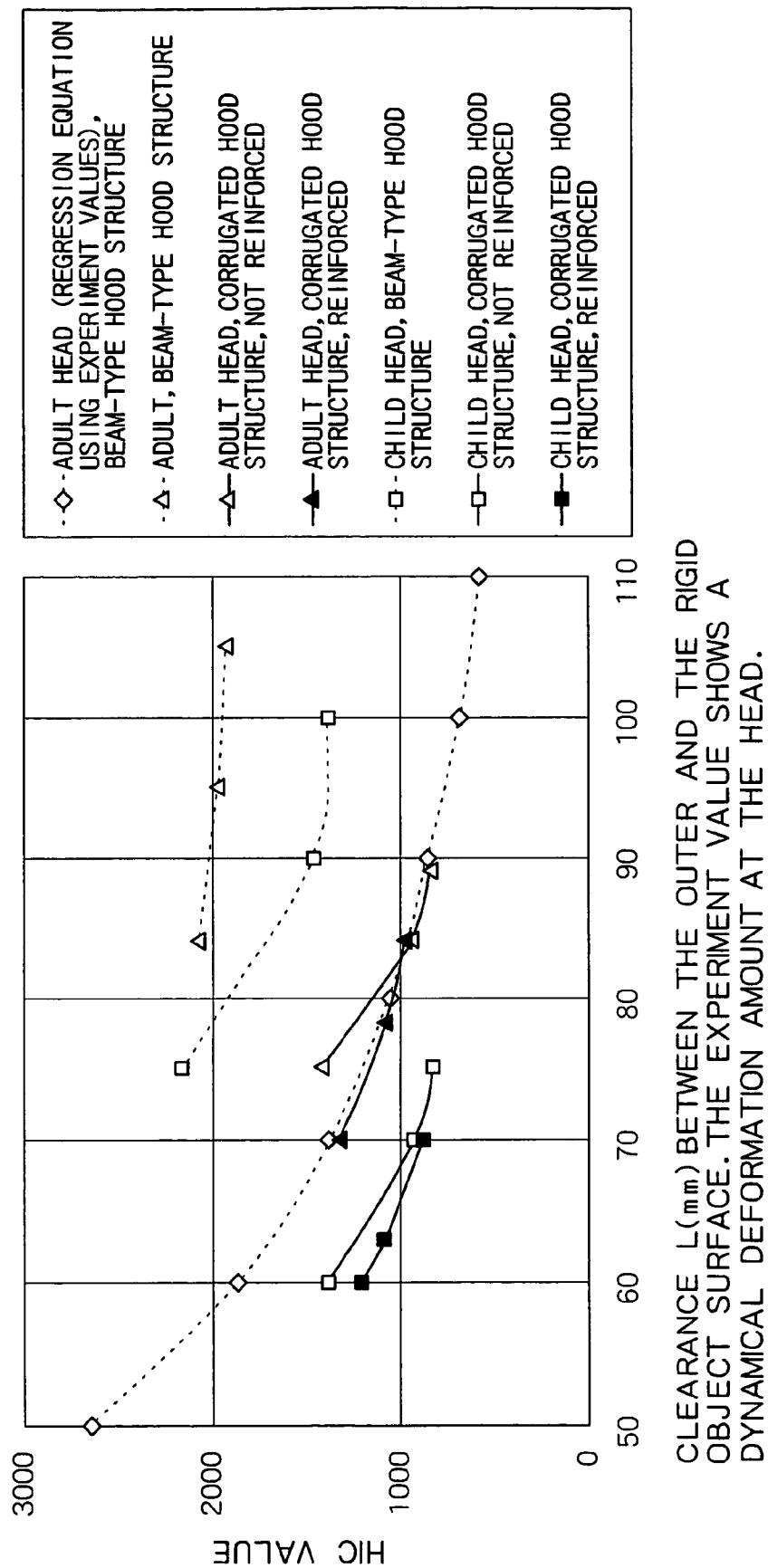
FIG. 26 is an explanatory diagram showing effects of clearance L between the outer and a rigid object side on HIC values through a combination of an adult head impact, a child head impact, the corrugated hood structure, and the beam-type hood structure.

FIG. 26 shows the relationship between an HIC value and clearance L. We examined the beam-type hood structure, the corrugated hood structure, and a corrugated hood structure with the inner center reinforced by increasing the plate thickness with respect to the child head impact and the adult head impact.

From the analysis results, we can conclude the following.

(a) The corrugated hood structure greatly decreases HIC values compared to the beam-type hood structure.

(b) It can be understood that the corrugated hood structure slightly decreases HIC values to decrease clearance L by reinforcing the plate thickness at the inner center. It is possible to decrease clearance L only by locally increasing the inner weight. This is very useful for the design.

(c) The following shows a regression equation for experiment values in case of the adult head impact on the steel beam-type hood structure (MATSUI and ISHIKAWA, Crush Characteristics and HIC Values in Front Windshield Areas in Pedestrian Head Impacts, JARI Research Journal, April 2000, Vol.22 No. 4). FIG. 26 shows a result.

$$Y_{HIC}=5.4\times10^6 X^{-1.95}$$

where $Y_{HIC}$ is an HIC value and X is a dynamical deformation amount at the head.

Clearance L between the outer and the rigid object surface is unknown to the regression equation for experiment values. The equation uses dynamical deformation amounts along the head impact direction as arguments. It is impossible to make a direct comparison with the analysis results by plotting clearance L between the outer and the rigid object surface on the abscissa. However, both tendencies approximately correspond with each other. The minimum clearance of 82.2 mm satisfies the HIC value 1000 obtained from the experiment result. This is approximately the same value as 83 mm obtained from the analysis result. At first glance, the corrugated hood structure seems to provide no merits. According to the analysis, however, the corrugated hood structure remarkably decreases HIC values compared to the beam-type hood structure. The HIC values obtained here for the simple model are excessively calculated for the purpose of simplification. It is considered that experiment values will show a much smaller value as the minimum value of clearance L for the corrugated hood structure. Here, we made no experiment on the corrugated inner structure for economical reasons. We consider that this point will be confirmed in the future.

(6) EXAMPLE 6

Decreasing HIC Values at the Hood Periphery

The head impact resistance for pedestrian protection is subject to effects of highly rigid positions such as a fender, the bottom of a window field frame, and the like at the hood periphery. It is known that a high HIC value results if the head impacts on these positions. According to many conventional design examples, the bead provided at the hood periphery has the cross-sectional shape approximate to a trapezoid. This cross-sectional shape causes high HIC values. As a countermeasure to this, it is preferable to provide the inner periphery with corrugated beads whose cross-sectional shape is or approximates to a sine wave. These beads can decrease HIC values at the above-mentioned positions.

Figure 27:
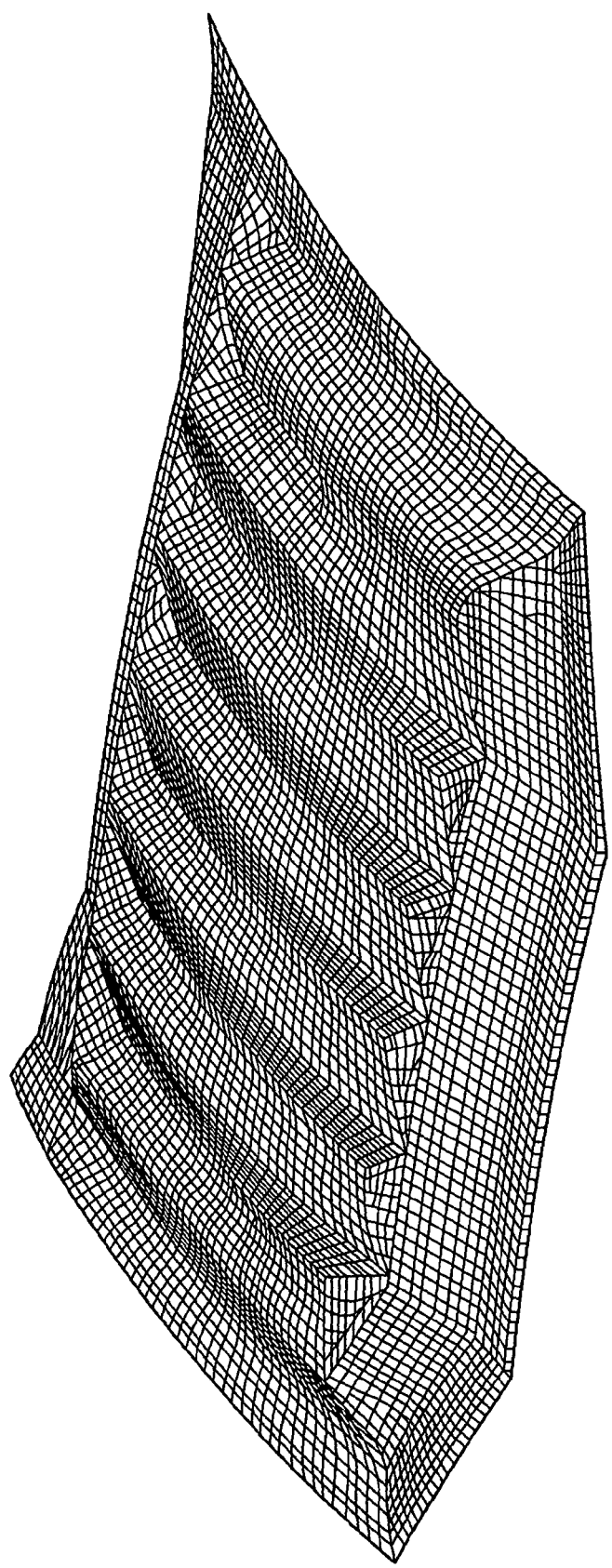
FIG. 27 is an explanatory diagram showing an example of the corrugated inner provided with a corrugated bead at a hood periphery.

FIG. 27 shows an example. The corrugation length, the corrugation height, and the cross-sectional shape at these peripheries are determined in consideration for the bending rigidity, the torsional rigidity, and the like. The corrugation length and the corrugation height need not be uniform on the entire surface of the hood. The most preferable corrugation length and corrugation height should be determined in consideration for the design requirements at respective hood positions. The hood periphery is especially subject to effects of highly rigid positions such as the fender, the bottom of the window field frame, and the like. For example, halving the corrugation length ensures a clearance between the outer and the inner to decrease HIC values.

(7) EXAMPLE 7

Figure 28:
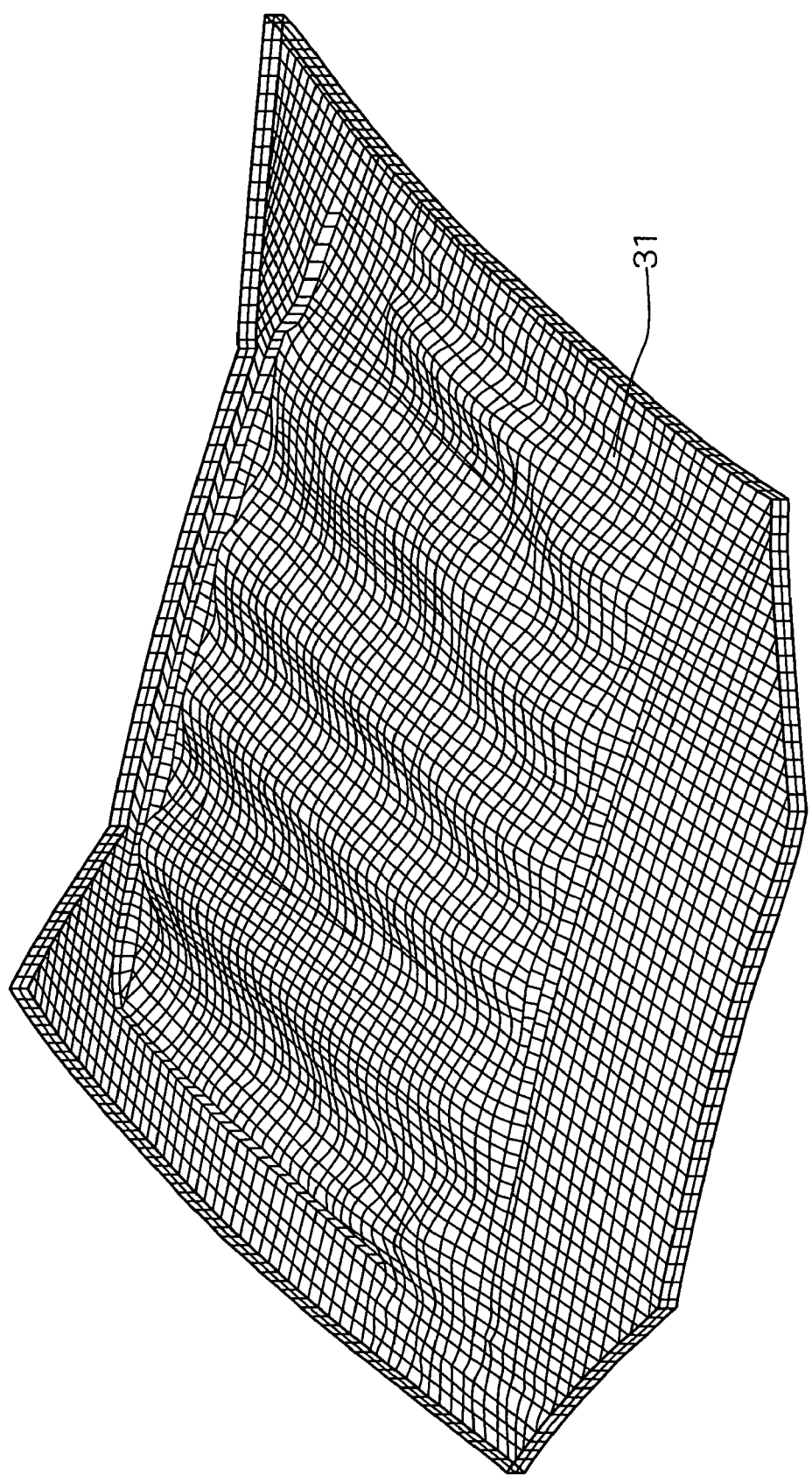
FIG. 28 is a perspective view showing a spline-type inner in consideration for arrangement of a rigid object in the engine room.
Figure 29:
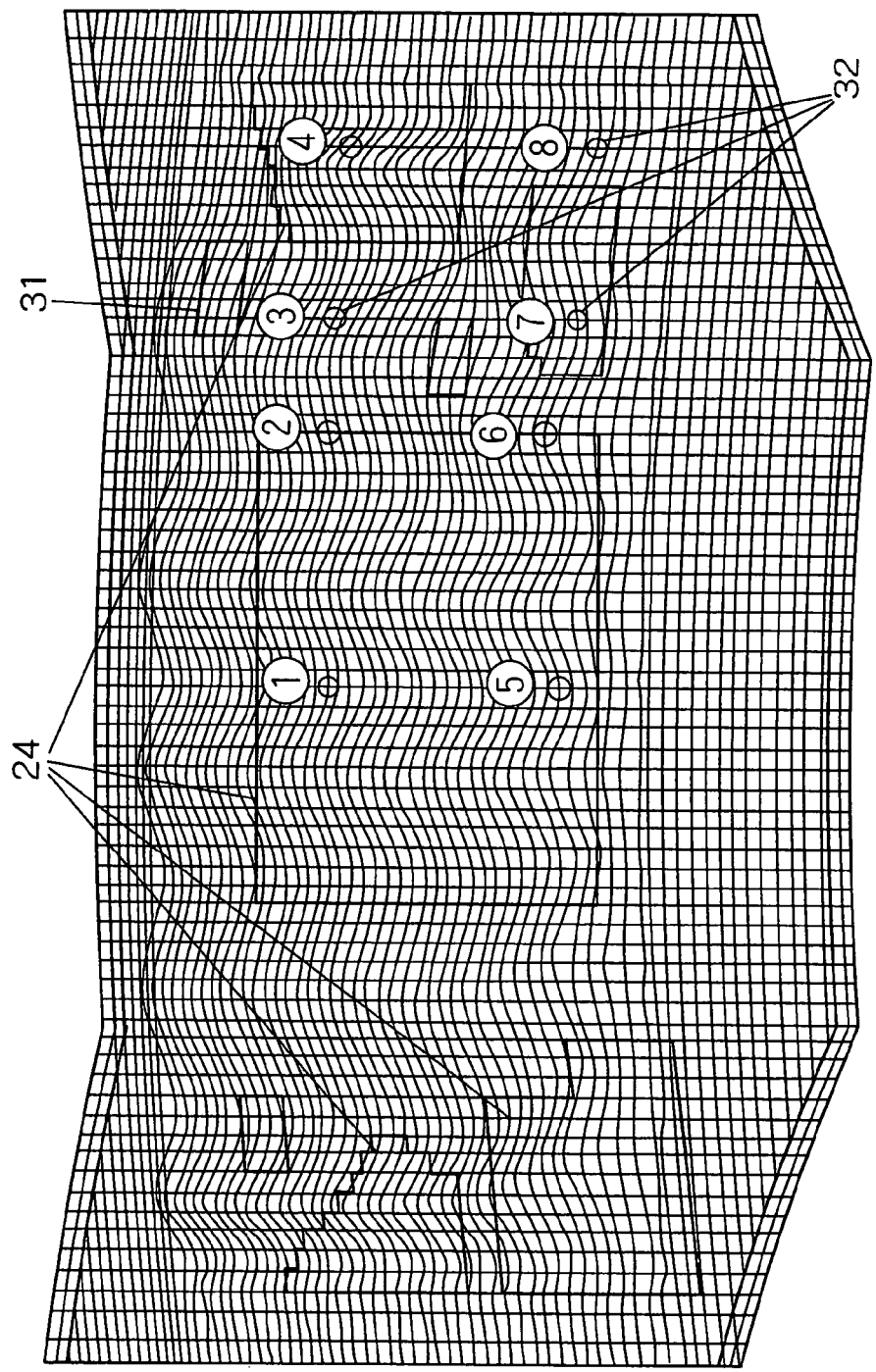
FIG. 29 is an explanatory diagram of the spline-type inner showing a rigid object side position in the engine room, impact positions 1 through 4 along WAD1500, and impact positions 5 through 8 along WAD1100, wherein the rigid object position is provided 70 mm perpendicularly below the outer.

Corrugated Hood Structure Comprising a Steel Outer and an Aluminum Alloy Spline-Type Inner The following description uses the spline-type inner and presents an example of the corrugated hood structure comprising the steel outer and the aluminum alloy inner. FIG. 28 shows the inner shape. FIG. 29 shows the positional relationship between the inner and the rigid object surface, and head impact positions.

Figure 30:
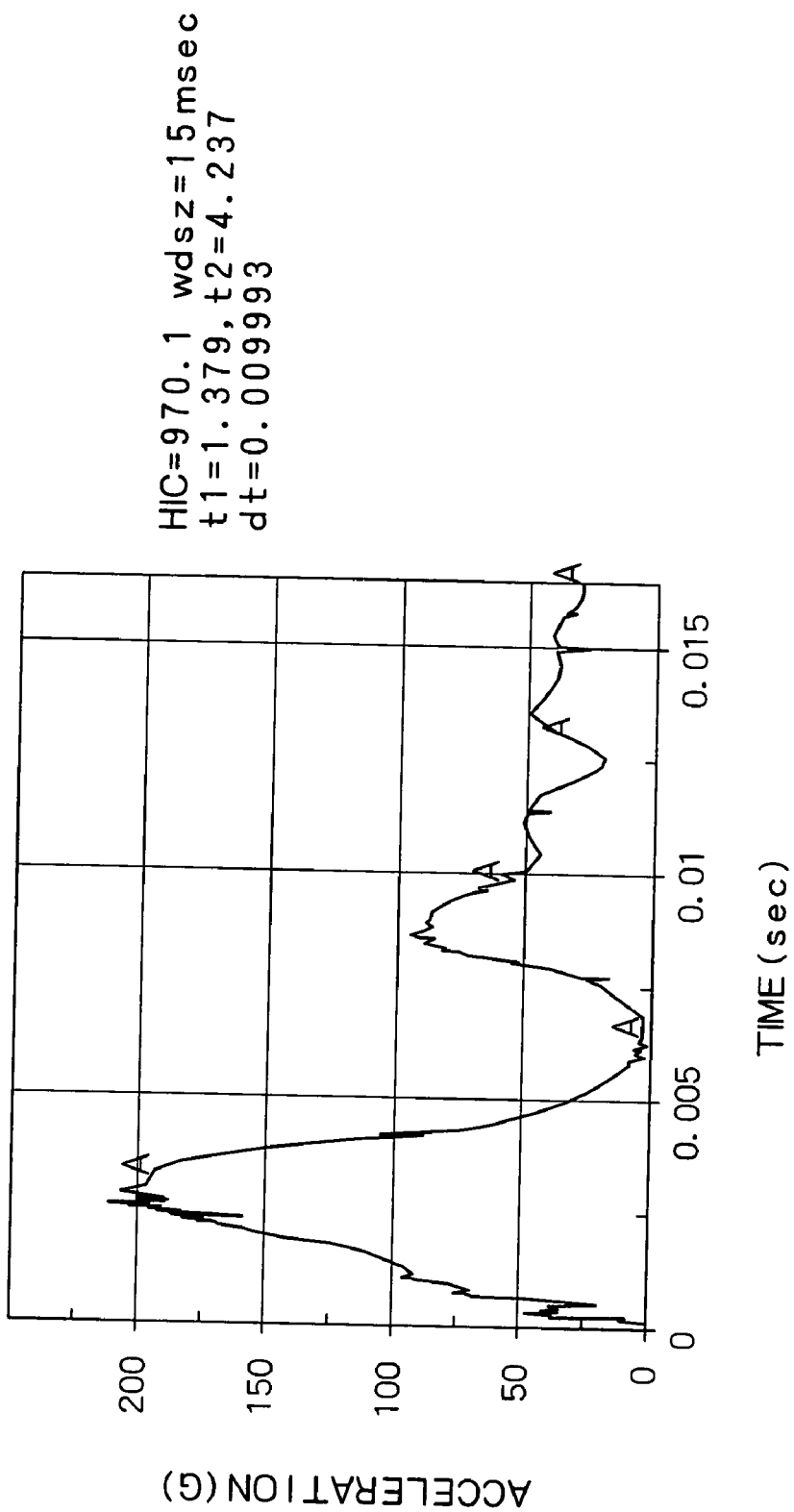
FIG. 30 shows a head acceleration waveform for the child head impact at impact position 1.
Figure 31:
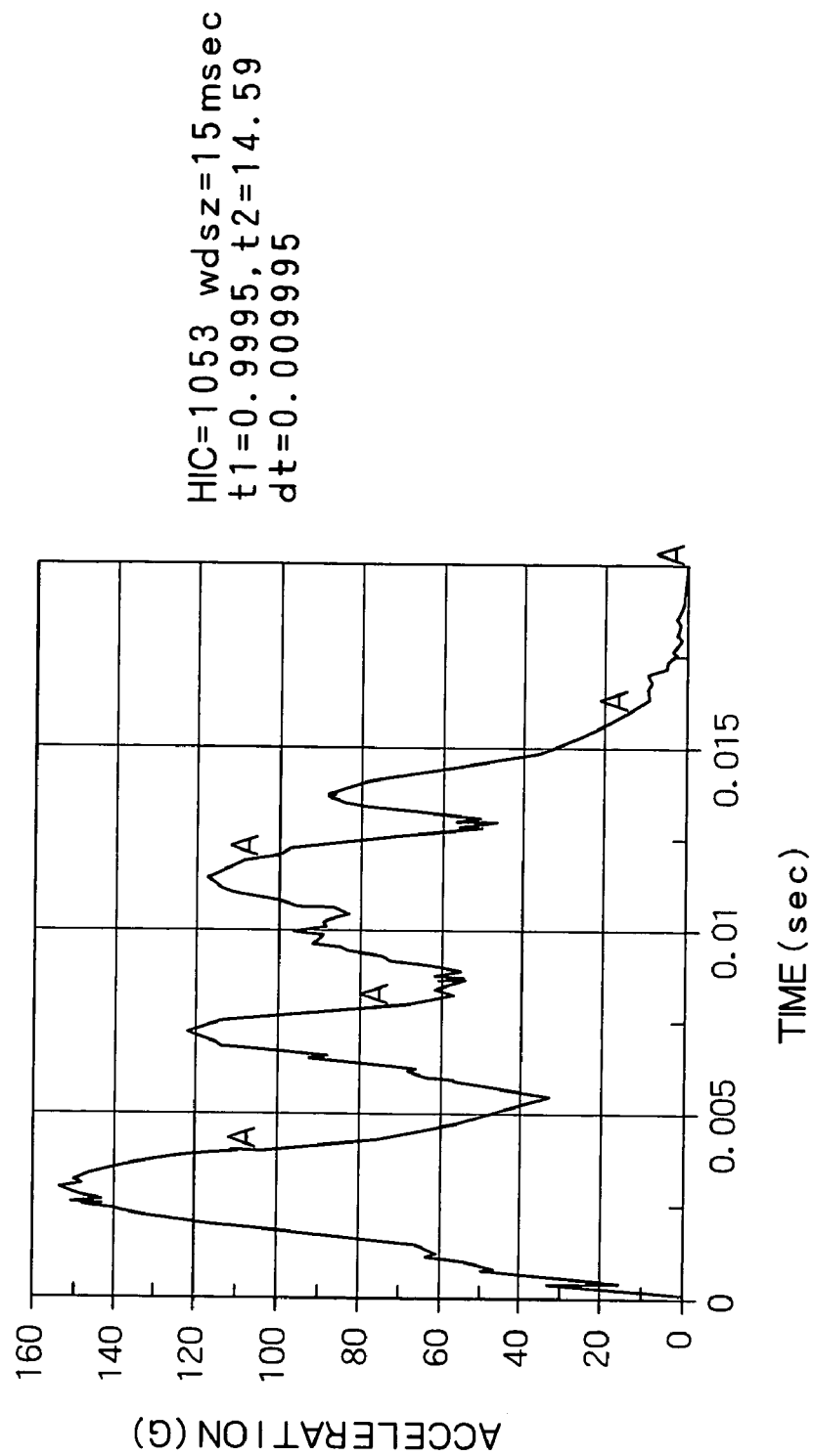
FIG. 31 shows a head acceleration waveform for the adult head impact at impact position 1.

This model uses several rigid object surfaces parallel to the outer to simply model the top surfaces of rigid objects such as an engine, a battery, and the like. For simplicity, there is provided a 70 mm uniform clearance between the outer and the rigid object surface in the vertical direction. The outer is made of an SS330-equivalent steel plate 0.7 mm thick. The inner is made of an aluminum 5000-series alloy 1.2 mm thick. Impact positions for the adult head are allotted on the WAD1500 line (impact positions 1 to 4). Impact positions for the child head are allotted on the WAD1500 line (impact positions 1 to 4) and on the WAD1100 line (impact positions 5 to 8) FIG. 30 shows a head acceleration waveform for the child head impact at impact position 1. FIG. 31 shows a head acceleration waveform for the adult head impact at impact position 1. Table 5 lists analysis results.

The analysis results have made clear the following facts.

(a) Except impact position 4, the condition of HIC value 1000 is almost satisfied for the adult and the child, yielding a good result.

(b) In case of the child head, the first acceleration wave shows approximately 200 G, producing an ideal head acceleration waveform. The outer absorbs almost all the kinetic energy. The second acceleration wave does not affect computation of HIC values. This is confirmed by the fact that time ranges t1 and t2 for computing HIC values in FIG. 30 are only applicable to the first acceleration wave.

(c) In case of the adult head, the HIC value of 1000 is approximately satisfied except impact position 4. The values for impact positions 1 and 2 slightly exceed the HIC value of 1000. This degree of fluctuations can be easily solved by examining the inner shape, the plate thickness, and the like in detail.

(d) The HIC values for the corresponding hood positions are appropriately controlled. We confirmed an effect of designing the spline-type inner in consideration for an impact on rigid objects complexly arranged in the engine room.

The adult head is subject to a head impact energy 1.92 times greater than the child head impact. When the above-mentioned similarity rule is applied, the steel outer causing the first acceleration wave of 200 G will have the plate thickness of 0.9 mm that is 1.27 times as large as the thickness of 0.7 mm. However, this plate thickness causes a value exceeding the HIC value of 1000 for the child head impact and is inappropriate for the child head impact. For this reason, the maximum plate thickness of the steel outer is 0.7 mm in consideration for both the adult and the child. In this case, the first acceleration wave for the adult head ranges from 120 to 150 G according to Table 5. The outer insufficiently absorbs the impact energy. The second acceleration wave needs to absorb the remaining kinetic energy. According to the prior numerical analysis, the plate thickness needed for the aluminum alloy inner is found to be 1.2 mm. The above-mentioned analysis model uses this value.

The analysis result here shows that the HIC value of 1000 is almost satisfied except impact position 4.

If the outer is made of an aluminum alloy, the outer's mass must be the same as that of the steel plate. In this case, the outer plate thickness becomes 2.1 mm, increasing costs. Accordingly, the use of the aluminum outer provides no merits.

If the inner is made of steel, the steel plate thickness is found on the condition that the inner provides the same bending rigidity as that of the aluminum alloy plate 1.2 mm thick. Assuming the same bending rigidity as mentioned above, there is a plate thickness ratio of 1.44 between the aluminum alloy and the steel plate. The steel plate thickness is found to be 0.83 mm by dividing 1.2 mm by 1.44. In this case, the steel inner weighs approximately twice the aluminum alloy inner. This is disadvantageous to weight saving.

As a result, it has been made clear that the corrugated hood structure comprising the steel outer and the aluminum alloy inner provides light-weight and low-cost hoods for large sedans and the like needed to satisfy both child and adult head impacts.

Unlike large sedans, medium-size or small-size cars can use an all-aluminum corrugated hood structure for their hoods if only the child head impact needs to be considered and a sufficiently large clearance can be ensured between the outer and the rigid object surface. If a sufficiently large clearance cannot be ensured between the outer and the rigid object surface, it is effective to use the above-mentioned corrugated hood structure comprising the steel outer and the aluminum alloy inner.

The cone-type hood structure comprising the steel outer and the aluminum inner provides a certain effect of decreasing HIC values, not so comparable to the corrugated inner. According to these figures, it is clear that an HIC value between the cone vertexes is larger than an HIC value at the cone vertex. This is because of the following reason. When the head impacts on a middle between the cone vertexes, the cone deformation greatly decreases absorption of the impact energy. The head impacts on the outer, and then straightly on the rigid object. It can also be seen that an HIC value for the adult head impact is larger than an HIC value for the child head impact. This tendency is the same as that for the corrugated hood structure. Further, we confirmed that changing the outer material from the aluminum alloy to the steel greatly decreases HIC values. As a result, it has been confirmed that, like the corrugated hood structure, the cone-type hood structure using the steel outer effectively decreases HIC values.

INDUSTRIAL APPLICABILITY

The present invention relates to a panel structure used for car body hoods.

The invention claimed is:

1. A car body hood panel structure as a closed sectional structure comprising a combination of:
   an outer panel;
   an inner panel, wherein a plurality of corrugated beads is provided parallel to each other on a major part of a surface of said inner panel such that a cross-sectional shape of said inner panel is corrugated; and
   an adhesive joining the corrugations of the inner panel with the outer panel, wherein the cross sectional corrugated shape of the inner panel satisfies the relationship 91 mm<p<221 mm, where p is a length of an entirety of each of the corrugations.

TABLE 5

| | | On line WAD 1500 | | | | On line WAD1100 | | |
|---|---|---|---|---|---|---|---|---|
| Head impact position | 1 | 2 | 3 | 4 | 5 | 6 | 7 | 8 |
| Adult head | HIC value | 1053 | 1061 | 923 | 1435 | — | — | — | — |
| | First acceleration wave (G) | 152 | 140 | 120 | 120 | — | — | — | — |
| | Second acceleration wave (G) | 120 | 115 | 112 | 150 | — | — | — | — |
| Child head | HIC value | 970 | 908 | 907 | 1215 | 989 | 1056 | 956 | 770 |
| | First acceleration wave (G) | 200 | 189 | 180 | 181 | 212 | 183 | 200 | 140 |
| | Second acceleration wave (G) | * | * | * | 133 | 165 | 100 | 117 | 80 |

An asterisk * indicates that the second acceleration wave does not contribute to computation of HIC values.

(8) EXAMPLE 8

Figure 32:
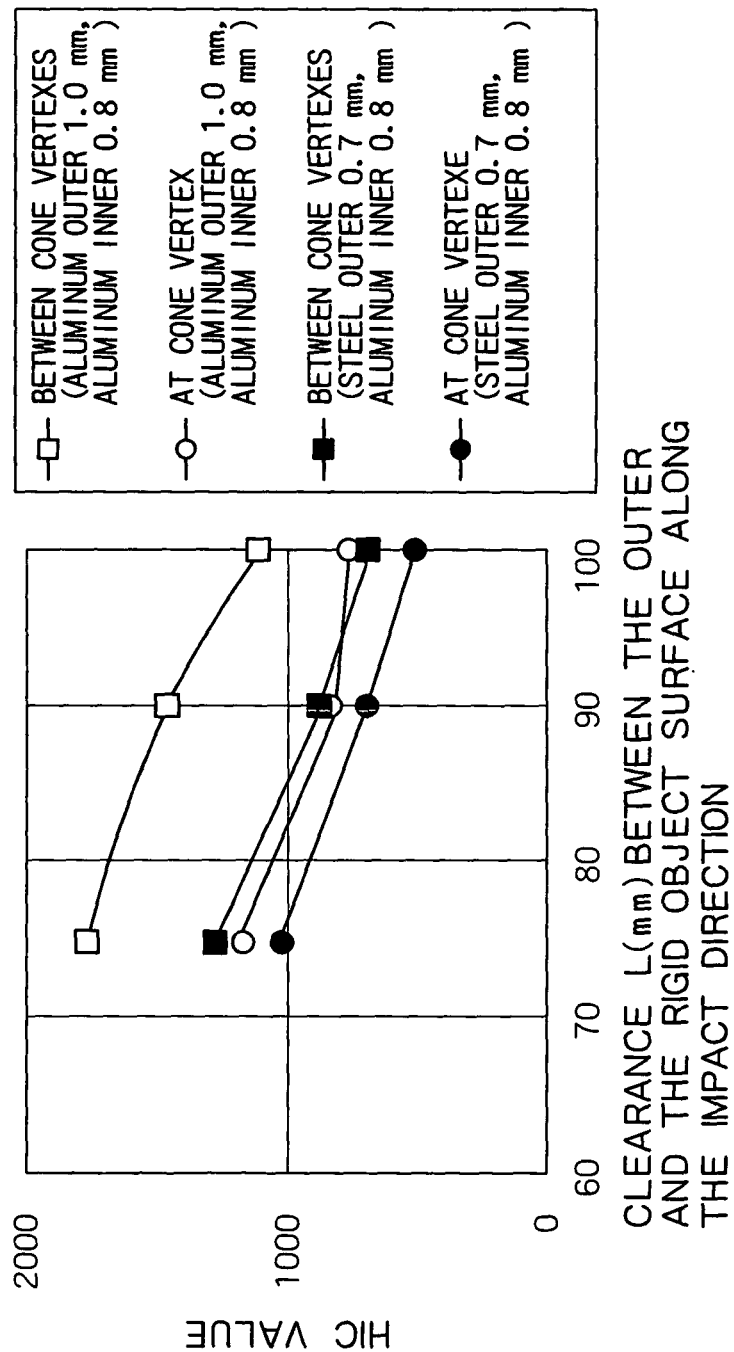
FIG. 32 shows an analysis result of the child head impact.

Cone-Type Hood Structure Comprising a Steel Outer and an Aluminum Alloy Cone-Type Inner Example 8 describes the cone-type hood structure comprising the steel outer and the aluminum alloy inner according to claim 12. That is to say, we analyzed this cone-type inner in a manner similar to that for example 7. We examined head impact positions in two case, i.e., a cone vertex at the hood center and a middle between cone vertexes. FIG. 32 shows an analysis result for the child head impact. FIG. 33 shows an analysis result for the adult head impact. Accord- 2. The car body hood panel structure according to claim 1, wherein said corrugated shape follows a sine curve or an nth-power-raised sine curve.

3. The car body hood panel structure according to claim 1, wherein said plurality of corrugated beads is provided in at least one arrangement selected from those which are parallel or slantwise against a longer direction of said panel structure, concentric approximately around the center of said panel structure, and doubly corrugated.

4. The car body hood panel structure according to claim 1, wherein one of said outer panel and said inner panel is aluminum alloy or steel.

5. The car body hood panel structure according to claim 1, wherein the cross sectional corrugated shape of said inner panel satisfies the relationship 19.5 mm<h<52 mm, where h is a corrugation height.

6. The car body hood panel structure according to claim 1, wherein a reinforce panel is provided to part of said inner panel.

7. The car body hood panel structure according to claim 1, wherein said adhesive is a resin, whereby said inner panel and said outer panel are softly joined at one of said corrugated beads of said inner panel.

8. The car body hood panel structure according to claim 1, wherein said inner panel is joined to said outer panel at said corrugated beads by means of soft joining sections which are arranged in a cross-stitched manner.

9. The car body hood panel structure according to claim 1, wherein said corrugated shape is defined by a spline function.

10. The car body hood panel structure according to claim 1, wherein said outer panel is steel and said inner panel is an aluminum alloy corrugated inner panel.

* * * * *

UNITED STATES PATENT AND TRADEMARK OFFICE
CERTIFICATE OF CORRECTION

| | |
|---|---|
| PATENT NO. | : 7,150,496 B2 |
| APPLICATION NO. | : 10/450248 |
| DATED | : December 19, 2006 |
| INVENTOR(S) | : Fujimoto |

It is certified that error appears in the above-identified patent and that said Letters Patent is hereby corrected as shown below:

On the title page, Item (73) should read:

-- (73)  Assignee:  **Kabushiki Kaisha Kobe Seiko Sho
          (Kobe Steel, Ltd.)**  Kobe (JP)--

Signed and Sealed this

Sixth Day of March, 2007

JON W. DUDAS
*Director of the United States Patent and Trademark Office*